(12) United States Patent
Obata et al.

(10) Patent No.: US 8,296,272 B2
(45) Date of Patent: Oct. 23, 2012

(54) INFORMATION PROCESSING APPARATUS, INFORMATION PROCESSING METHOD, AND PROGRAM

(75) Inventors: Hideo Obata, Kanagawa (JP); Shigeru Kashiwagi, Tokyo (JP); Masayoshi Ohno, Tokyo (JP)

(73) Assignee: Sony Corporation (JP)

( * ) Notice: Subject to any disclaimer, the term of this patent is extended or adjusted under 35 U.S.C. 154(b) by 341 days.

(21) Appl. No.: 11/999,513

(22) Filed: Dec. 5, 2007

(65) Prior Publication Data

US 2008/0154974 A1 Jun. 26, 2008

(30) Foreign Application Priority Data

Dec. 26, 2006 (JP) ................ P2006-349698

(51) Int. Cl.
*G06F 17/30* (2006.01)
(52) U.S. Cl. ...................................... 707/691
(58) Field of Classification Search .................. 707/690, 707/691
See application file for complete search history.

(56) References Cited

U.S. PATENT DOCUMENTS

| | | | |
|---|---|---|---|
| 6,356,908 B1 * | 3/2002 | Brown et al. ................. | 707/755 |
| 2002/0170058 A1 * | 11/2002 | Chang ............................. | 725/41 |
| 2003/0076322 A1 * | 4/2003 | Ouzts et al. .................... | 345/440 |
| 2005/0013208 A1 | 1/2005 | Hirabayashi et al. | |
| 2006/0112018 A1 * | 5/2006 | Lee ................................ | 705/59 |
| 2006/0242163 A1 * | 10/2006 | Miller et al. .................. | 707/100 |
| 2006/0269147 A1 * | 11/2006 | Shen et al. .................... | 382/232 |
| 2007/0198595 A1 * | 8/2007 | Obata et al. ................... | 707/690 |

FOREIGN PATENT DOCUMENTS

| | | |
|---|---|---|
| JP | 2004-227630 A | 8/2004 |
| JP | 2005243120 A | 9/2005 |
| JP | 2005348404 A | 12/2005 |

OTHER PUBLICATIONS

TechIMO.com, "Thumbnail for Video Files under Windows XP?", Jun. 30, 2002, accessed Mar. 17, 2010 at http://www.techimo.com/forum/applications-operating-systems/ 26053-thumbnail-video-files-under-windows-xp.html.*
Hurlbut, Thumbs DB Files Forensic Issues, 2005.*

* cited by examiner

*Primary Examiner* — William Spieler
(74) *Attorney, Agent, or Firm* — Lerner, David, Littenberg, Krumholz & Mentlik, LLP

(57) ABSTRACT

An information processing apparatus which may include basic-file management means for managing a file stored in a storage medium by utilizing basic-file management information stored in the same storage medium, specific-file management means for managing a specific type file in files which are adapted to share predetermined management-use information items out of management-use information items set to each file owned by the basic-file management means, and which are managed by the basic-file management means by utilizing specific-file management information stored in the storage medium, comparing means for comparing, when performing an index display in which the specific type file to be stored in the storage medium is displayed in an index style, a content of the management-use information item, about the specific type file to be displayed in the index display, shared by the basic-file management information and the specific-file management information, and display controlling means for executing the index display such that a comparison result by the comparing means is reflected.

34 Claims, 12 Drawing Sheets

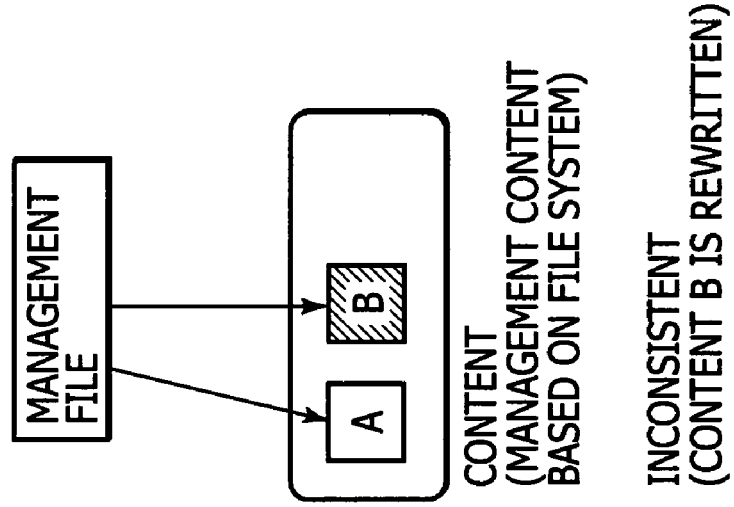
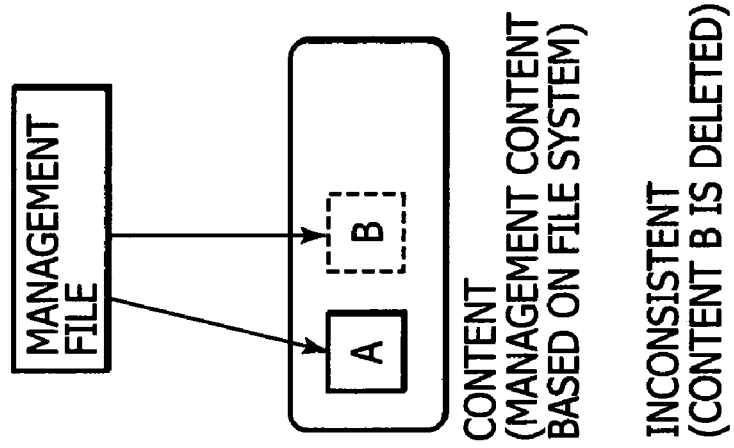
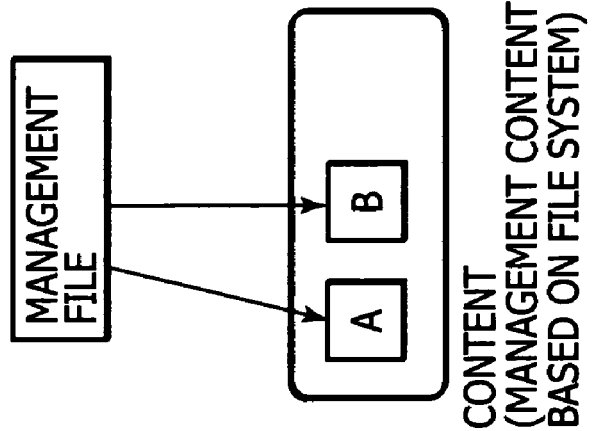

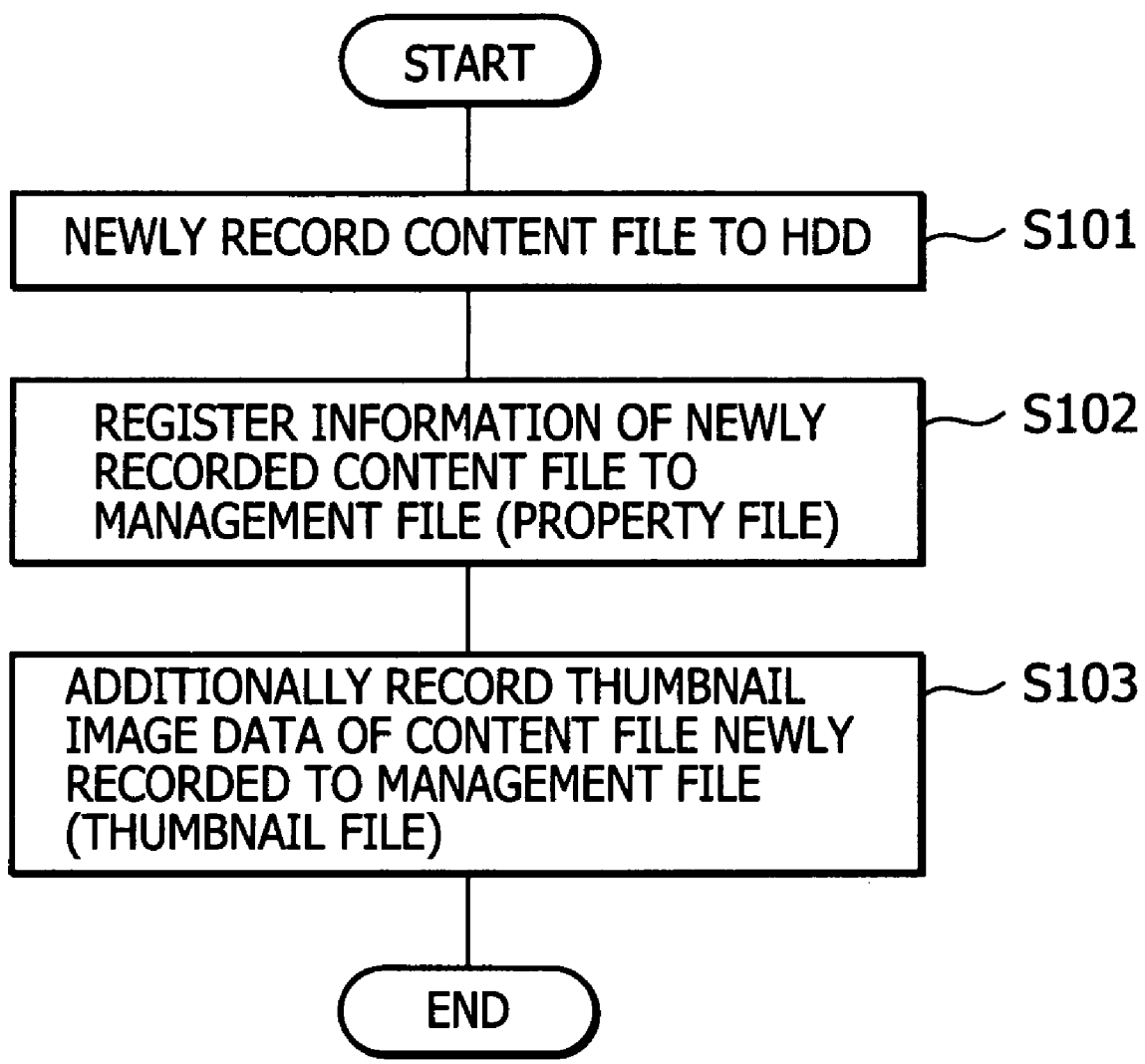

INFORMATION PROCESSING APPARATUS, INFORMATION PROCESSING METHOD, AND PROGRAM

CROSS-REFERENCE TO RELATED APPLICATIONS

This application contains subject matter from Japanese Patent Application No. 2006-349698 filed in the Japanese Patent Office on Dec. 26, 2006 and Japanese Patent Application No. 2005-379328 filed in the Japanese Patent Office on Dec. 28, 2005, the entire contents of both such patent applications are incorporated herein by reference. Further, this application claims priority from Japanese Patent Application No. 2006-349698.

BACKGROUND OF THE INVENTION

1. Field of the Invention

The present invention relates to an information processing apparatus which executes writing and reading information to and from a storage medium, and a method thereof. The present invention relates also to a program to be executed by such an information processing apparatus.

2. Description of Related Art

When data to be stored on various types of storage media, such as a hard disk drive (HDD), is managed, a file system is often adopted to manage the data in file units. As an example of a format of such a file system, FAT and Hierarchical File System (HFS), for example, are known.

The existence of such a file system between, for example, an application and a driver or the like of a storage medium allows the application to perform operations (file operations), such as reading or writing of a file, without being conscious of a physical data storage structure of the storage medium.

Further, recently, storage capacities of many types of storage media are increasing due to factors such as reduction in cost per bit and improvement in recording density. At the same time, high speed of various types of information processing is progressed. Under such a situation, the storage medium has become capable of storing a file (content file) of data formed by a content such as a large number of still pictures, moving pictures, or sounds.

Under a current situation, examples of apparatuses for recording and playing back a content such as still pictures, moving pictures, or sounds include a digital still camera and a digital video camera. In such apparatuses, given the situation where a large number of content files can be stored in the storage medium, factors such as ease of searching and browsing and enough accompanying information become important in view of convenience for users.

As described earlier, the file system originally aimed to be used for managing the data stored in a storage medium at file units. Thus, file-related information items defined by the file system are limited to basic information items, such as a file name (an extension, as well), a file size, date and time of creation, and date and time of updating. For example, in the case of a content file in which an image serves to be an information content of the content file, it is preferable that various types of information other than the above-described basic information be presented, for example, in the form of a list. However, this is difficult to achieve by a file management based solely on the file system.

Further, since the file system is basically adopted in various types of storage media such as a HDD, conversely, it is difficult to extend accompanying information of this type.

Therefore, it has been proposed and implemented that a basic management generally about files stored in the storage medium is performed by the file system as has been done, and at the same time, management information (management file) of a file type formed to include information for exclusively managing the content file stored in the storage medium is used (see Japanese Patent Application Publication No. 2004-227630).

SUMMARY OF THE INVENTION

Incidentally, in an actual implementation of a device that manages the content file by adopting the management file as described above, an imaging device, such as a digital video camera and a digital still camera, may be considered, for example. Recently, most imaging devices of such a type mount a Universal Serial Bus (USB) mass storage class. When such a device which supports the USB mass storage class is connected to a personal computer as a host, the personal computer may recognize a storage medium included in the device as an external storage device connected to the personal computer and may normally access the storage device, even though driver software is not installed on the host.

However, when the imaging device supports the USB mass storage class as described above, this means that when a normal file operation from the personal computer connected by the USB is performed, it may be possible to record a file into the storage medium of the imaging device, delete the file therefrom, update the file therefor, and so on.

Thus, when a user operates on the personal computer, for example, it may become difficult to avoid a possibility where addition and recording of a file is made into the storage medium of the imaging device, or the content file stored in the storage medium of the imaging device is modified, deleted, and so on. However, even though the operation to the file stored in the storage medium of the imaging device is thus performed from the personal computer side, a rewriting of the management information corresponding to the file system of the storage medium of the imaging device is appropriately performed under the USB mass storage class, in response to a result of file operation. Therefore, it is designed such that a file management content in the storage medium itself is not ruptured. However, when the imaging device is designed to manage the content file stored in the storage medium also by the management file as described above, following inconvenience may occur.

Some management files are capable of managing the content file stored in the storage medium, but this management function is completed in the imaging device. Thus, in this sense, the function is not generally used. For example, the personal computer connected to the imaging device by the USB mass storage class may not be able to support the content-file management function by the management file unless application software particularly supported by the management file or the like is mounted. Further, in a state of being connected by the USB mass storage class, the imaging device merely provides the storage medium as the external storage device, and does not particularly start an internal application or the like.

Thus, when any file operation to the content file stored in the storage medium of the imaging device is thus performed from the personal computer connected by the USB mass storage class, the result of the file operation is thus reflected on a file system of the storage medium. However, the management file is not particularly rewritten, and this means that the result of the file operation at that time is not reflected on the management file.

That is, in a state where the storage medium of the imaging device is treated as the external storage device of the host by the USB mass storage class or the like and if the operation to the content file from the host side is performed, there occurs inconsistency between the file system and the management file about the content file management stored in the storage medium of the imaging device.

The possibility of occurrence of such inconsistency may arise at each time that the connection is made by the USB mass storage class. However, it is not preferable to operate the imaging device while the management of the content file is not performed appropriately resulting from the inconsistency because it may cause troubles such as malfunction of the device and inappropriate list display of the content files. As a result, as the imaging device, it may be necessary to check at least whether there occurs inconsistency between the file system and the management file at each time that the USB connection is cut.

To check the presence or absence of such inconsistency, all content files managed by the file system and all content files managed by the management file may be compared, for example. However, such a comparison process involves frequency access to the storage medium, and as a comparison process, a significant load is applied, and thus, a certain amount of process time is required. By the way, in order that the imaging device completes its starting operation when the USB connected is cut off, the check of the inconsistency may also need to be completed. This lowers a performance capability regarding starting a system of the imaging device when the USB connection is cut off, for example.

In view of the above-described issues, an information processing apparatus in an embodiment of the present invention may be configured to include:

basic-file management section for managing a file to be stored in a storage medium by utilizing basic-file management information to be stored in the same storage medium; specific-file management section for managing a specific type file in files which are adapted to share predetermined management-use information items out of management-use information items set per each file owned by the basic-file management means, and which are managed by the basic-file management means by utilizing specific-file management information stored in the storage medium; comparing section for comparing, when performing an index display in which the specific type file stored in the storage medium is displayed in an index style, a content of the management-use information item, about the specific type file to be displayed in the index display, shared by the basic-file management information and the specific-file management information; and display controlling section for executing the index display such that a comparison result by the comparing means is reflected.

Further, an information processing apparatus in an embodiment of the present invention may be configured to include: basic-file management section for managing a file to be stored in a storage medium by utilizing basic-file management information stored in the same storage medium; specific-file management section for managing a specific type file in files which are adapted to share predetermined management-use information items out of management-use information items set to each file owned by the basic-file management means, and which are managed by the basic-file management means by utilizing specific-file management information stored in the storage medium; comparing section for comparing, when playing back and outputting the specific type file stored in the storage medium, a content of the management-use information item, about the specific type file to be played back and outputted, shared by the basic-file management information and the specific-file management information; and playbackability-and-outputability setting section for setting, in response to a comparison result by the comparing means, playbackability and outputability of the specific type file to be played back and outputted.

In each of the above configurations, the file stored in the storage medium may be managed by utilizing the basic-file management information, and in addition, the specific type file, out of the files managed by the basic-file management information, may also be managed by the specific-file management information. Further, in an embodiment of the invention of the present application, the predetermined management-use information items owned by the basic-file management information may be shared also in a structure of the specific-file management information.

When the index display of the specific type file is executed or when the specific type file is playbacked and outputted, the basic-file management information and the specific-file management information about the specific type file to be index-displayed or the specific type file to be played back and outputted may be used to compare contents of the management-use information items shared therebetween. As an embodiment of the invention of the present application, based on the comparison of the contents of the management-use information items between the basic-file management information and the specific-file management information, the consistency between the file management by the basic-file management section and that based on the specific-file management section may be determined. Based on a result of the determination (comparison result), the index display may be performed or playbackability and outputability of the specific type file to be played back and outputted may be set.

With such a configuration, the determination about the consistency may be performed only about the index display of the specific type file or a content to be played back and outputted, and thus, it may become unnecessary to perform a consistency determination in which all of specific type files are checked in a certain predetermined occasion.

BRIEF DESCRIPTION OF THE DRAWINGS

FIGS. 5A, 5B, and 5C are diagrams each of which shows an example of a state of inconsistency generated when a file operation to a HDD of the digital video camera of the embodiment is performed by an external information processing apparatus;

FIG. 6 is a flowchart showing an example of a management-file processing operation at the time of recording a content file in the digital video camera of the embodiment;

DETAILED DESCRIPTION

Hereinafter, a description is given of a best mode for carrying out the present invention (hereinafter referred to as an embodiment). As the embodiment, an example of a case where a configuration of an information processing apparatus which is the invention of the present application is applied to a digital video camera is provided.

Figure 1:
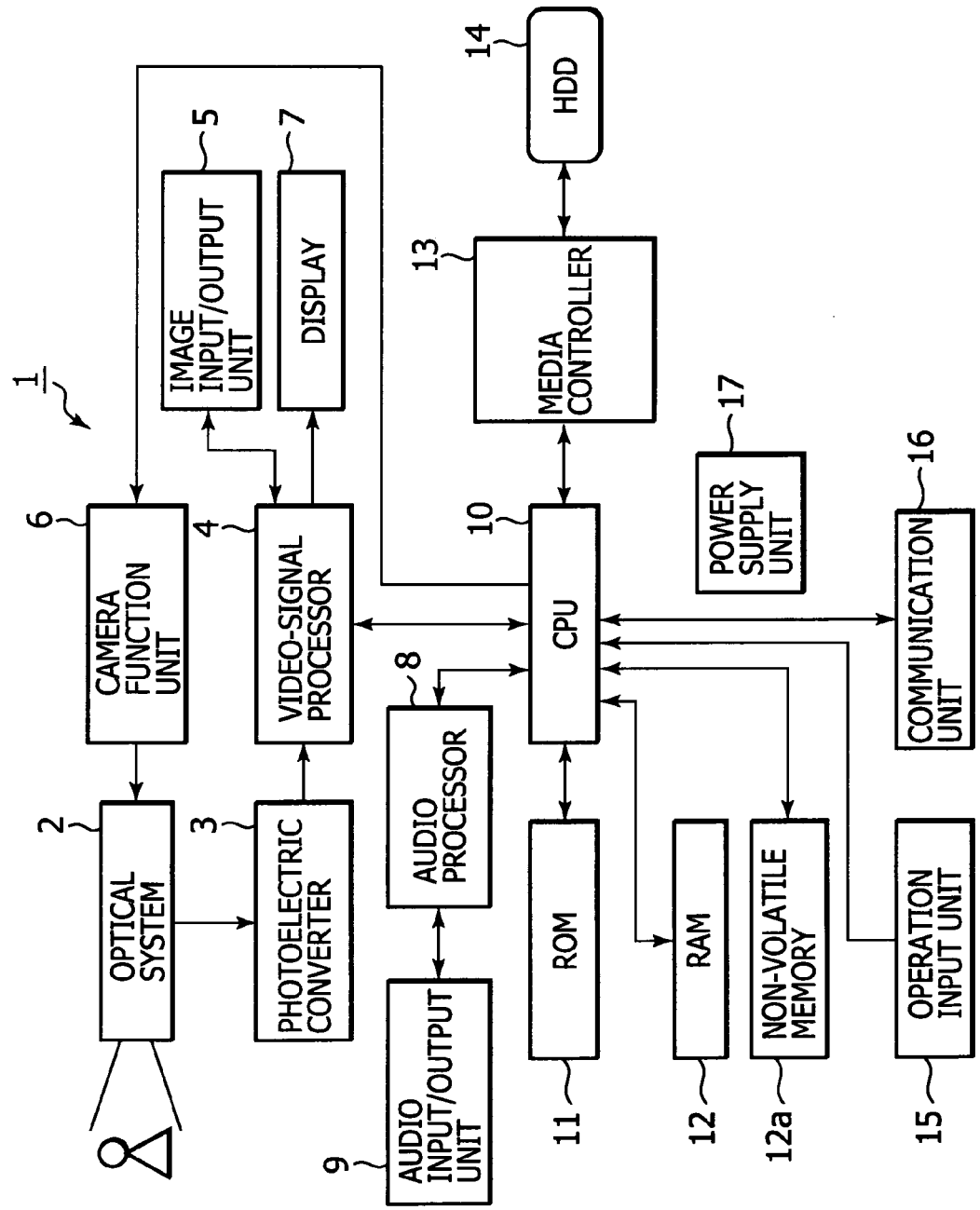
FIG. 1 is a block diagram showing a configuration example of a digital video camera, which is an information processing apparatus, as an embodiment of the present invention.

FIG. 1 is a block diagram showing a configuration example of a digital video camera 1, as an embodiment of the present invention.

In the digital video camera 1 shown in FIG. 1, an optical system 2, which includes an imaging lens, a diaphragm, etc., collects incident light, as an imaging light, onto a photoelectric converter 3 to form an image. The optical system 2 further includes a focus adjustment mechanism for adjusting a focus, a diaphragm adjustable mechanism for adjusting a diaphragm in accordance with a diaphragm stop, etc., and such mechanism units are driven by a drive signal outputted from a camera function unit 6. Under the control of a CPU 10, the camera function unit 6 is adapted to output a required drive signal to obtain an appropriate focus state, a diaphragm state, and the like.

When an optical zooming function is imparted, for example, a zoom mechanism for moving a zoom lens may be provided in the optical system 2, and similar to the above case, a drive unit for moving the zoom mechanism may be provided in response to the control of CPU 10. Further, the camera function unit 6 may be configured to include a stroboscope so that a stroboscopic light-emitting function is imparted.

The photoelectric converter 3 includes a Charge Coupled Device (CCD), which is a photoelectric conversion element, a CMOS sensor, etc., for example, and photoelectrically converts an imaging light which enters from the optical system 2 to be formed into image on a light receiving surface to generate an imaging signal and output to a video signal processor 4. At the time of photographing, an instruction of a shutter speed determined in response to an exposure setting result, for example, is notified from the CPU 10 to the video signal processor 4. The video signal processor 4 outputs a scanning timing signal corresponding to the notified shutter speed to the photoelectric converter 3. The photoelectric converter 3 is adapted to perform scanning in response to the scanning timing signal, execute a photoelectric conversion process, and output a video signal.

The video signal processor 4 applies a gain adjustment, a sample-and-hold process, for example to an analog video signal (captured image signal) inputted from the photoelectric converter 3 to perform waveform shaping, and thereafter performs an A/D conversion, to convert the analog video signal into digital video signal data. The video signal processor 4 further executes on the digital video signal obtained by the conversion process a video signal process including a process for generating display-use luminance data, for example, such that a display is performed on a display 7. As a result, the video-signal processor 4 is also capable of executing a signal process for a so-called on-screen display such that a character image or the like may be displayed by being superposed on the captured image in response to the control of the CPU 10.

An actual display device that is adopted as the display 7 is not particularly limited. Under the current situation, a liquid display panel is extensively used.

Further, the video-signal processor 4 is capable of generating compressed video data by applying, for example, a compression encoding process according to a predetermined scheme on the digital video signal obtained by converting the analog video signal inputted from the photoelectric converter 3.

The digital video camera of the present embodiment includes a still camera function. That is, a still-picture data file in a predetermined format, which is a photograph, may be generated from the captured image signal. An image process like this is also performed by the video-signal processor 4.

The video-signal processor 4 is also capable of converting an image (video) signal inputted from the photoelectric converter 3, a file of audio-video (AV) data (AV file) read out from a medium described later, into an analog video signal or a digital video signal in a predetermined format, and outputting these signals to an external device or the like via an image input/output unit 5.

The image input/output unit 5 is capable of being inputted with a video signal in a predetermined format from outside, and displaying the inputted video signal on the display 7 via a process of the video-signal processor 4. Further, the video-signal processor 4 is capable of converting the video signal inputted by the image input/output unit 5 into data for recording, similarly to the case of the analog video signal inputted from the photoelectric converter 3, and transferring the data for recording to a media controller 13.

To respond to this process, the image input/output unit 5 includes a video (image) signal output terminal/video signal input terminal according to a predetermined format, for example.

The digital video camera 1 of the embodiment includes an audio processor 8 and an audio input/output unit 9 to allow input and output of an audio signal.

Firstly, regarding the audio input, the audio input/output unit 9 includes a microphone or the like and adapted to collect external sound to convert them into an audio signal for audio input. The thus inputted audio signal is then outputted to the audio processor 8. The audio processor 8 performs an audio signal process, such as conversion into compressed audio data encoded according to an audio compression encoding scheme corresponding to compression encoding of the captured image, for example.

The CPU 10 is adapted to execute a control process for forming an AV file of a predetermined format, which is formed by the compressed video data regarding the captured image obtained by the video-signal processor 4 and the compressed audio data regarding the collected sound obtained by the audio processor 8. In the AV file, a playback time axis of the audio outputted by playing back the compressed audio data is synchronized with a moving picture outputted by playing back the compressed video data. Example of configurations for actually forming the AV file may include a software configuration, which is process of a digital signal obtained as a result of the CPU 10 executing a program, or a configuration such that hardware for forming the AV file is provided, and in addition, the CPU 10 controls an operation of the hardware.

For example, data as the AV file is transferred to the media controller 13 under the control of the CPU 10 as data for recording. The CPU 10 is also capable of transferring a still-picture data file in a predetermined format, which is a picture image generated by the video-signal processor 4, to the media controller 13 as the data for recording.

The audio input/output unit 9 may be configured to include an audio-signal input terminal or the like so that an audio signal is inputted from an external audio device or the like. The audio processor 8 converts the audio signal inputted from the audio-signal input terminal into a digital audio data file in a predetermined format. The CPU 10 may also transfer data of such a digital audio data file to the media controller 13 as the data for recording.

The media controller 13, in cooperation with the CPU 10, is configured to execute a control process relating to a data process, corresponding to a predetermined type of medium (storage medium). The data process into the medium herein refers to a process relating in some way to data to be stored in the medium, such as a formatting process of the medium, and a process of writing/reading information or the like for a file or a file management into/from a storage area of the medium.

In the embodiment, an example in which a HDD (hard disk drive) 14 is connected to the media controller 13 is shown. As is known, an HDD is a storage device having a magnetic disk as a storage medium. Under the current situation, the HDD is considered as one of the storage media having a lowest cost per bit and having a favorable recording density. With the HDD, it is possible to obtain a large storage capacity of a gigabyte class at a relatively low cost. Further, as is known, physically reading/writing of data from/to a magnetic disk, which is a storage medium, is realized by a magnetic head by applying a magnetic field or detecting a magnetic field while tracing tracks formed on the magnetic disk.

The HDD 14 in this case is fixedly contained in the digital video camera 1, for example. However, the HDD 14 may take a removable mode, according to a predetermined standard, to be detachable to and from the digital video camera 1 (host).

As described earlier, in response to a transfer of the data for recording, the media controller 13 further transfers the data for recording to a medium selected out of the media (the HDD 14) connected to the media controller 13. In the medium to which the data is transferred, the data is written and stored in a storage area in response to an instruction from the media controller 13 side. The data thus stored in the medium is stored and managed as a file. The file stored in the medium is managed based on a file system of a predetermined format.

For example, when the AV file is played back among the files stored in the medium, the CPU 10 and the media controller 13 access and read out a designated AV file. The AV file thus read out is separated into compressed video data and compressed audio data by a process of the CPU 10, for example. The compressed video data is passed to the video-signal processor 4 while the compressed audio signal is passed to the audio processor 8.

In this case, the video-signal processor 4 and the audio processor 8 execute a required played back-signal process including demodulation on the compressed video data and the compressed audio data transferred thereto as described above, respectively. Thereby, an image obtained by playing back the compressed video data is displayed on the display 7, and in synchronization with a played back time of the image, an audio signal obtained by playing back the compressed audio data are outputted as sound from a speaker owned by the audio input/output unit 9 or outputted from a headphone terminal.

Further, for example, an audio data file played back from the medium may undergo an audio signal process of the audio processor 8, and thereafter, may be outputted to outside via the audio input/output unit 9 as an audio signal or audio data in a predetermined format. In this case, the audio input/output unit 9 includes an audio output terminal corresponding to predetermined formats of the audio signal or audio data outputted from the audio processor 8.

The Central Processing Unit (CPU) 10 executes a program for executing various control processes regarding the digital video camera 1. A ROM 11 is stored with various programs executed by the CPU 10, various setting information used by the CPU 10 to execute a process, and so forth. A RAM 12 is used as a work area when the CPU 10 executes a process according to a program, and holds data, such as various operation results.

A non-volatile memory 12a includes a memory element having a characteristic where a stored content is not deleted even when power supply is stopped, such as a flash memory, for example. Under the control of the CPU 10, writing/reading of data is executed. Typically, data (information) to be stored in the non-volatile memory 12a is, setting information or the like whose content is modified appropriately, but it is not limited to setting information, and it is sufficient if required various types of information may be stored according to an actual specification of the digital video camera 1 and other relevant factors.

An operation input unit 15 in this case refers collectively to various operating elements provided in the digital video camera 1. For example, examples of the operating element of the operation input unit 15 include a shutter button operated when taking a picture, an operating element for selecting an imaging mode or the like, and an operating element for increasing/decreasing a parameter value.

The communication unit 16 is a location configured to mount hardware and software for communicating with an external device according to a predetermined data communication system in response to the control of the CPU 10. In an actual implementation of the embodiment, the communication unit 16 adopts an Universal Serial Bus (USB). Besides, the digital video camera 1 of the embodiment mounts the USB mass storage class.

Since the digital video camera 1 thus supports the USB mass storage class, for example, when the digital video camera 1 of the present embodiment is connected with an external information processing apparatus, such as a personal computer with the USB in between, the external information processing apparatus may become capable of mounting the HDD 14, which is a medium on the side of the digital video camera 1, as an external removable medium, and accessing the HDD 14.

For example, it is widely performed that content files stored in a storage medium of a digital imaging device, such as a digital video camera or a digital still camera, are often copied to an HDD of a personal computer so that the content files may be managed or edited by application software of the personal computer. Similarly to the case of the digital video camera 1 of the present embodiment, when the digital imaging device mounts the USB mass storage class, it is may not be necessary to install a driver or the like at the time of connection for storing a content file of the digital imaging device to the personal computer. As a result, it becomes fairly simple and highly versatile.

In the invention of the present application, a data communication system supported by the communication unit 16 is not particularly limited regardless of distinction between wired and wireless communications. Further, the number of supported data communication systems should not be limited. Under the current situation, examples of data communication systems that may be adopted include, in addition to the USB, a network protocol such as Ethernet™ or data bus systems such as the Institute of Electrical and Electronic Engineers (IEEE) 1394 in the case of wired communications. In the case of wireless communications, inter-device short-range wireless communication protocols such as Bluetooth™ or wireless LAN (Local Area Network) protocols such as IEEE 802.11a/b/g.

A power supply unit 17 supplies power for operation to various hardware devices in the digital video camera 1, and is configured to include a power supply circuit that operates in receipt of power supply from a battery and a power supply adaptor, for example.

As described above, the digital video camera 1 of the embodiment is adapted such that an AV file, which contains a moving picture and audio, obtained by imaging and collecting sound, or a still-picture file, which is a picture, may be stored in the medium (the HDD 14).

A file stored in the medium is usually managed base on a file system of a predetermined format. In the embodiment, a file is managed based on an File Allocation Table (FAT) file system. As is known, the FAT file system is adapted to manage a file by a tree-shaped directory structure, and writing/reading of data is performed by logical minimum data management units called clusters. In the cluster, one unit corresponds to a predetermined number of sectors, which are physical minimum units of writing data to or reading data from a medium.

In the embodiment, among files managed based on the file system (FAT) and stored in the medium as described above, an AV file (moving-picture file) or a still-picture file of a picture or the like are included in a file classification (type), which is called a content file, due to the reason that an information content (content) to be played back and outputted is meaningful for the user, and thus, these files are distinguished from a certain type of a file such as a system-related file.

Besides, in the embodiment, a file stored on the HDD 14 includes a management file dedicated to a content (hereinafter simply referred to as a management file) including a management information content for managing the content file exclusively.

Further, in the embodiment, a backup file of the management file is generated and stored on the HDD 14.

Figure 2:
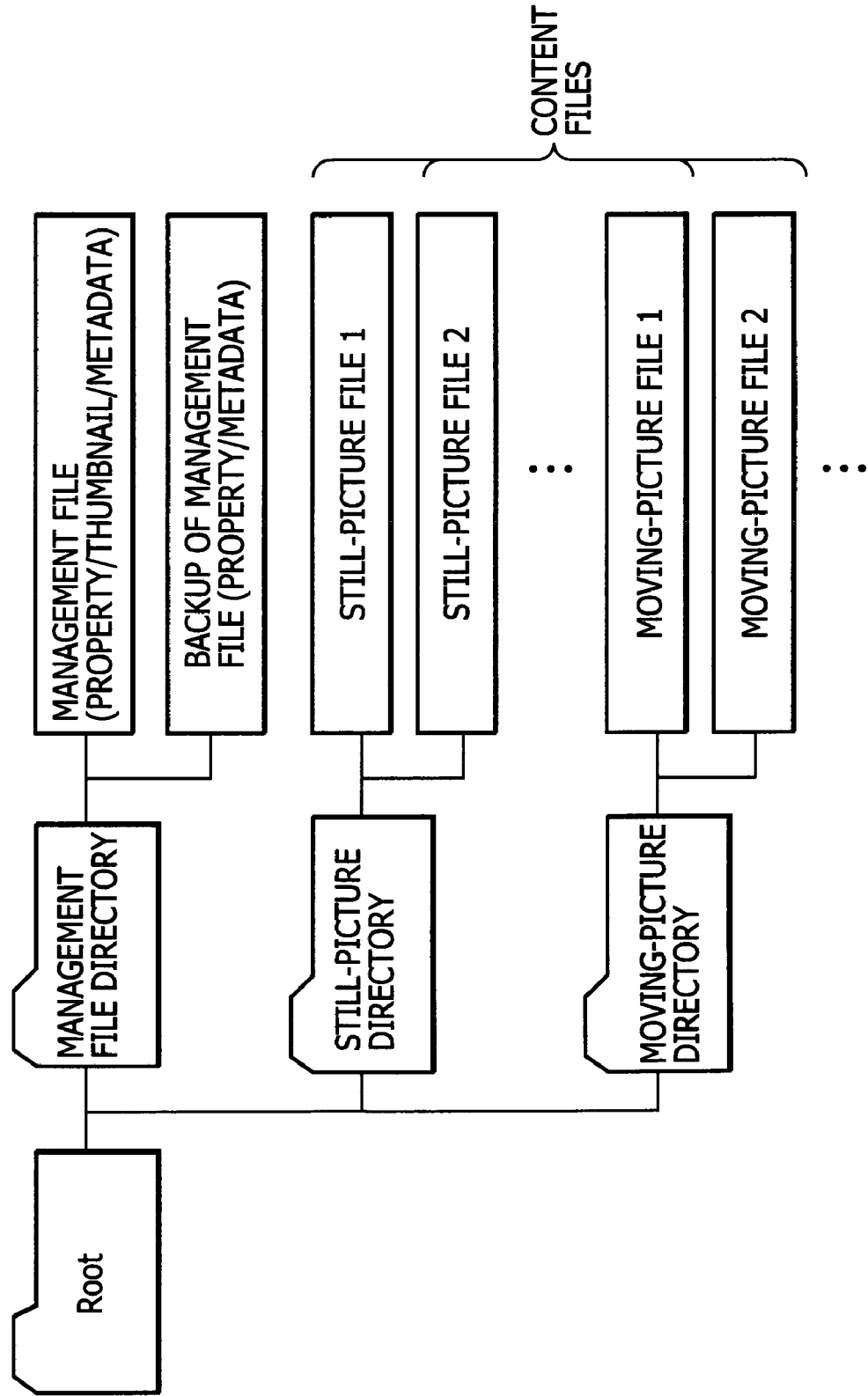
FIG. 2 is a diagram showing in a directory structure an example of a management mode of a content file, a management file, and a backup file, based on a file system in the embodiment.

FIG. 2 is a directory structure, which is constructed based on the FAT file system, of the HDD 14 in the digital video camera 1 of the embodiment.

In the directory structure of the HDD 14, for example, as shown in FIG. 2, immediately under a Root directory, a management-file directory, a still-picture directory, and a moving-picture directory are arranged.

Of these directories, the still-picture directory and the moving-picture directory serve as directories for storing the content file. That is, the still-picture directory is stored with one or more still picture files of pictures or the like, and the moving-picture directory is stored with a moving-picture file such as the AV file described earlier.

The management-file directory is stored with a management file and a backup file of the management file. As will be described later, in an actual implementation of the management file of the embodiment, the management file includes a set of a property file, a thumbnail file, and a metadata file, for example. The backup file of the management file includes backup files of the property file and the metadata file.

The thumbnail file includes image data, and thus, it has a considerably large file size. Thus, the thumbnail file may save a storage capacity when a backup thereof is not taken. The thumbnail file may be reconstructed (restored) at any time as long as consistency is maintained between the management file and the file system. For these reasons, the thumbnail file is not included in the backup file.

It is needless to say that in the case where saving of storage capacity does not particularly matter, for example, when the storage medium has an extremely large capacity, or in the case where backup of the thumbnail file has a high priority due to system specifications or other factors, the thumbnail file may be included in the backup file without causing any particular problem.

Further, in an actual implementation of the embodiment, the management-file directory is set to be invisible during ordinary use. Therefore, the management file and the backup file stored in the management-file directory are also invisible. Since the management file and the backup file are used by the system side for content management, it is preferable, for example, that unintended deletion or rewriting by the user may be prevented. This is why these files are managed as invisible files in the embodiment.

Figure 3:
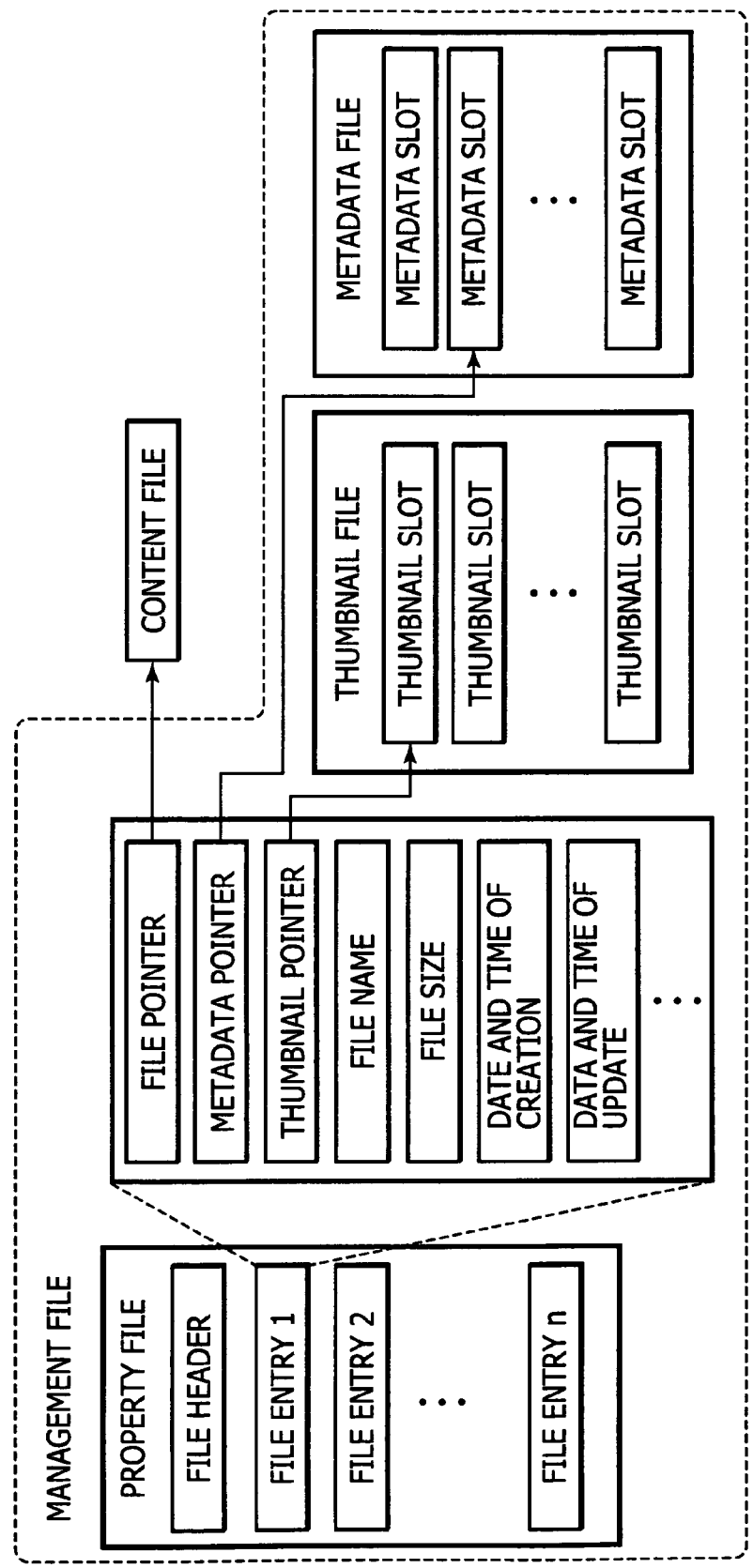
FIG. 3 is a diagram schematically showing a structural example of the management file.

FIG. 3 shows an example of a structure of the management file of the embodiment.

As described earlier, the management file may be further divided into the property file, the thumbnail file, and the metadata file. In the embodiment, a set of the property file, the thumbnail file, and the metadata file is treated as the management file. Among the property file, the thumbnail file, and the metadata file, the property file is required and the thumbnail file and the metadata file are optional.

As shown in FIG. 3, the property file is formed as a set of a file header and one or more file entries (1 to n). Each file entry is associated with a content file on a one-to-one basis, and stores basic information relating to the content file. A structure of entry file will be described later.

The thumbnail file is formed to include one or more thumbnail slots. Basically, each thumbnail slot is associated with one content file, and stores thumbnail image data, which is a representative image showing the associated content file.

The metadata file is formed of one or more metadata slots. Each metadata slot is also associated with one content file. A title slot is capable of storing arbitrary information items, such as data in a text format (to be used for comments or the like) or information indicating grouping of content files.

Although not shown, an internal structure of the file header in the property file includes: information indicating date and time of creation and date and time of updating of the current property file; information indicating a size of each file entry; information indicating the number of stored file entries; a thumbnail-file list; and a metadata-file list, etc.

The thumbnail-file list stores: information indicating date and time of creation and date and time of updating of each thumbnail file; information indicating a size of each thumbnail slot; and information indicating the number of stored thumbnail slots, etc.

The metadata-file list stores: information indicating date and time of creation and date and time of modification of each metadata file; information indicating a size of each metadata slot; and information indicating the number of stored metadata slots, etc.

A structure of each file entry in the property file is formed to include, for example, as shown in FIG. 3, information such as: a file pointer; a metadata pointer; a thumbnail pointer; a file name; a file size; a date and time of creation; and a date and time of updating, etc.

The file pointer is information of a pointer pointing to the associated content file. In an actual implementation, the pointer indicates by specifying a location of the associated content, for example, by a path managed by the file system.

The thumbnail pointer points to a thumbnail slot that is associated with the current file entry (i.e., a thumbnail slot associated with the content file pointed to by the file pointer of the current file entry) in the thumbnail file. The thumbnail file is formed, for example, by logically concatenating fixed-length thumbnail slots. Thus, the thumbnail pointer may become capable of specifying one thumbnail slot by, for example, designating a disposition order of the thumbnail slots in the thumbnail file.

The thumbnail image data stored in the thumbnail slots in the thumbnail file may be used so that it is displayed as an icon (thumbnail image) indicating a file when a file-list image is displayed on the display 7.

The metadata pointer points to a metadata slot associated with the current file entry (i.e., a metadata slot associated with the content file indicated by the file pointer of the current file entry) in the metadata file. The metadata file also is formed, such that fixed-length metadata slots are logically concatenated. Thus, the metadata pointer also may become capable of specifying one metadata slot, for example, by designating a disposition order of the metadata slots in the metadata file.

In fields of the file name, the file size, the date and time of creation, and the date and time of updating, provided in each file entry, information indicating a file name, a size, a date and time of creation, and a date and time of updating of the content file pointed to by the file pointer of the current file entry are stored, respectively.

Although not shown, each file entry may store information other than the file pointer, the metadata pointer, the thumbnail pointer, the file name, the file size, the date and time of creation, and the date and time of updating described above. As one example, when a system that uses the management file of the embodiment mounts a positioning system such as GPS (Global Positioning System), position information or the like of which position is detected by the positioning system is included and stored in an information element in the file entry.

As will be understood from the above description, each content file stored in the medium (HDD 14) of the digital video camera 1 is associated with the file entry by the file pointer in the file entry. One thumbnail slot is specified by referring to the thumbnail pointer in the file entry, and in this case, this thumbnail slot is associated with the content file associated with by the file pointer. Alternatively, one metadata slot designated by the metadata pointer of the file entry is associated with the content file associated with by the file pointer.

That is, some management files manage such that one content file stored in the medium is associated with thumbnail image data (thumbnail slot) associated with the content file and information (metadata slot) of an arbitrary content relating to the content file, based on the pointer of the property file.

When an application that processes the content file utilizes the information of the file management like this, the content file may be managed more efficiently, as compared with a case where the management of content file is based solely on the file system. For example, when searching for a file, information stored in the file entry, information stored in the metadata slot, or the like are added as a search condition, whereby, it becomes possible to perform the searching by inputting a larger number of search conditions than in a case where the management of content file is based on the file system. That is, a more sophisticated searching function becomes available. This may also be advantageous when displaying on the display 7 the content file stored on the HDD 14. For example, when displaying the thumbnail image, the thumbnail image may be read out from the thumbnail file and played back for outputted. Thus, it may not need to access data of the content file on the HDD 14 to generate the thumbnail image on each occasion. As a result, a list screen may be displayed quickly. It may also be possible to present various types of accompanying information in the form of a list, using the information stored in the file entry, the information stored in the metadata slot, or the like.

Figure 4:
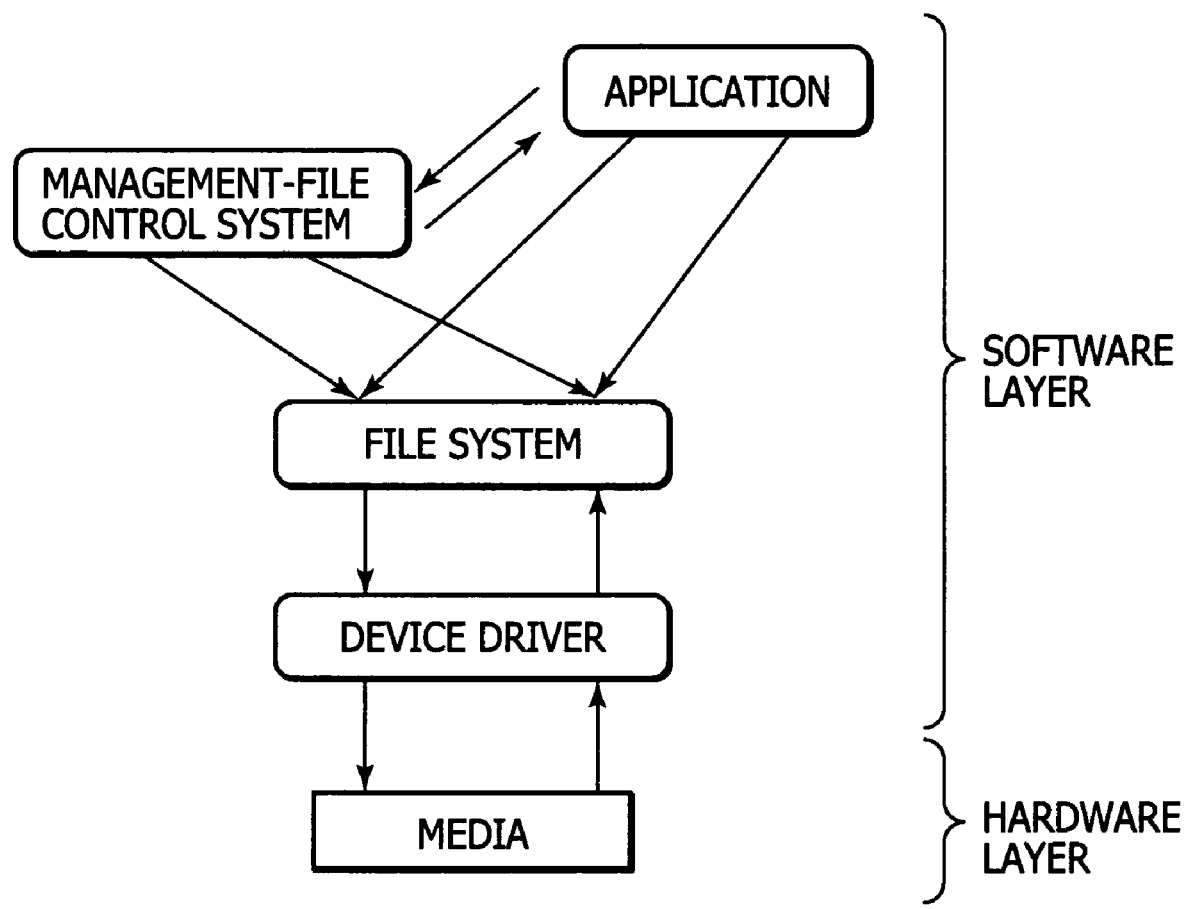
FIG. 4 is a diagram showing a system configuration regarding a media (HDD) access using a hierarchical model in a digital video camera of the embodiment.

FIG. 4 shows, as described above, a hierarchical model to describe a system configuration in the case where the file is managed based on the FAT file system and the content file is managed based on the management file.

Firstly, the hierarchical model is generally divided into a software layer and a hardware layer below the software layer.

In this case, the software layer corresponds to software processing achieved by a program, various types of firmware or middleware, or the like, executed by a CPU in a device that serves as a host (in the embodiment, the digital video camera 1) for a medium. The software layer of this case basically includes layers of application, file system, device driver, in that order from top to bottom, and also includes a management-file controlling system, as shown in FIG. 4.

The hardware layer may be considered as a layer in which a physical storage area of the medium (HDD 14) itself is located.

The application in this case has various process functions (recording, playing back, updating, etc.) about files, and makes a file-level access request to the management-file controlling system.

The file system corresponds to software which realizes functions as the file system. In the embodiment, the FAT file system is adopted, and thus, the software for providing the functions of the file system is configured to support the FAT file system.

As is known, the FAT file system is adapted to manage the stored file based on a tree-shaped directory structure, and manages the files as a set of cluster units. The file management and data management described above are realized by using management information (file-system management information) including a directory entry and table information called File Allocation Table (FAT). The directory entry is information indicating a location of a file or a directory (subdirectory) on a medium at a cluster level, and the FAT is information indicating a chain (link or connection) on a level of clusters forming the directory or the file. Access to these pieces of file-system management information (directory entries and FAT) and operations on these pieces of file-system management information, such as updating of the file-system management information in response to results of file operations such as reading (playing back) or writing (appending or updating), are executed in the file-system layer.

The file system converts the file-level access request from the application (and the management-file controlling system described later) into a level of clusters that serve as units of data management in the format of the FAT file system, and issues an access request to a device driver.

The device driver corresponds to software for controlling a medium that serves as a device to be controlled, and converts the cluster-level access request based on the FAT file system format from the file system into a level of sectors that serve as units of writing data to or reading data from the medium, and issues a request for accessing the medium.

The medium of this case is logically formatted (initialized) according to the FAT file system. In FIG. 1, a HDD corresponds to the medium of this case. In response to the sector-level access request from the device driver, the medium reads out data from a designated sector address and returns the data to the device driver. That is, an access response on a sector level is executed.

The device driver receives the sector-level access response from the medium, that is, receives data of sector units. Then, the device driver processes the received data as data of cluster units and passes the data to the file system (cluster-level access response).

The file system is adapted to pass the data received from the device driver to the application as file-level data. The application executes a required application-level process on the data received as a file according to an operation input by a user, for example.

The management-file controlling system corresponds to software which realizes file operating functions such as generating the management file shown in FIG. 3, and reading/writing data from/to the medium. For example, when the application searches a content file by using the management file, the management file fetched by reading out from the medium by the management-file controlling system is referred.

Further, when performing as the file operation of the application, recording, deletion, updating, and so forth, of the content file, an access request and receiving of the read-out data are made via the management-file controlling system. In this case, the application and the management-file controlling system may perform a file-level communication using, for example, a file name, or a mutually-agreed file ID.

In response to a result of the file operation by the application described above, the management-file controlling system is adapted to update (rewrite) the management file so that the result of the operation is reflected. As described above, the management-file controlling system performs the operation of the management file. In the embodiment, as described with reference to FIG. 2, a backup file of the management file exists, and the backup file may also need to be updated according to the result of operation of the content file by the application. The management-file controlling system also executes a file operation of the backup file.

For example, when the management-file controlling system requests the management file access, similarly to the application, the management-file controlling system issues the request to the file system on a file level. In layers lower than that of the file system, the access request and the data exchange are performed similarly to the case described above, and the data of the management file is returned to the management-file controlling system.

As will be understood from the above description, in the digital video camera 1 of the embodiment, the files stored in the storage medium are generally managed based on the file system (FAT: basic file management means), and further, among the files, the content file (a specific type file) is also managed based on the management file. In such a file management configuration, to achieve a proper file management, it may become necessary that a content of the file management on the file system side and that based on the management file be consistent with each other.

In the digital video camera 1 of the embodiment, the USB mass storage class is supported, as described earlier with reference to FIG. 1. When the USB mass storage class is supported, it means that a personal computer connected via the USB to the digital video camera 1 may execute a file operation or the like on the HDD 14 of the digital video camera 1 because the personal computer regards the HDD 14 as an external storage device (drive) mounted thereon. This probably causes inconsistency in a management content between the file system and the management file. This will be described with reference to FIGS. 5A to 5C.

FIG. 5A schematically shows a state where two files, namely, content files A and B, are managed based on the file system and the contents A and B are managed appropriately based on the management file as well.

Herein, provided that the digital video camera 1 of the embodiment is connected via the USB to the personal computer, under the state shown in FIG. 5A.

Since the digital video camera 1 of the embodiment supports the USB mass storage class, the HDD 14 of the digital video camera 1 is viewed as an external storage device on the personal computer side, as described above, thereby enabling a file operation (new recording, deletion, modification, and so on of files) stored on the HDD 14 from the personal computer side. That is, for example, when the user performs the operation on the personal computer, it may become possible to newly record a file on the HDD 14, delete the file therefrom, or to load the file by the personal computer to make some modifications, and rewrite (update) the file on the HDD 14. Herein, in this case, it is provided that by the operation from the personal computer side, the content file B is deleted under the state of the file management shown in FIG. 5A.

Since the HDD 14 of the digital video camera 1 is mounted in the personal computer as the external storage device, when the personal computer deletes the content file B, this means that a process in which the file system management information (directory entry, FAT) of the HDD 14 is rewritten is executed from the personal computer.

However, when the personal computer is thus connected by the USB mass storage class, the digital video camera 1, which is the storage device side, is in a state of completely assigning to the personal computer side an access control right to the HDD 14, and thus, the digital video camera 1 side is generally configured not to access the HDD 14 to execute the process. Further, the management file stored on the HDD 14 as a file is merely a file when viewed from the file system, and the management file does not have function to check whether its content manages the content file. The management file is basically utilized in a file management completed in a single digital video camera 1, and corresponds to a program for managing files or the like, which is mounted by the digital video camera 1, for example.

Thus, the deletion of the content file B by the operation from the personal computer side as described above leads to a state where the file system manages such that the content file B is deleted and the content file A only is stored on the HDD 14, but the management file manages such that the content file B as well as the content file A are stored on the HDD 14, as shown in FIG. 5B. That is, a state of inconsistency is generated in which a difference occurs between the file management content based on the file system and that based on the management file.

In another example, provided that a file operation for rewriting the content of the content file B so that it is changed is performed on the personal computer side under a state of FIG. 5A. In this case also, the file management content of the file system is updated corresponding to the rewriting of the content file B, but the management file is not updated corresponding to the file operation and the content file B is managed by the content which is before the rewriting of the content file B. Therefore, in this case, the inconsistency is again generated between the file management based on the file system and that based on the management file.

As understood from these examples, in a state where the digital video camera 1 of the embodiment is connected to the personal computer by the USB mass storage class and when the file operation is performed on the HDD 14 from the external information processing apparatus, a state of inconsistency is generate in which the management content of the file system does not match that of the content file based on the management file.

Then, provided that the USB connection between the digital video camera 1 and the personal computer is cut in the state where the inconsistency is generated as in FIGS. 5B and 5C, and the digital video camera 1 is restored to a state where it is used as a single unit, for example. Just to ascertain, the digital video camera 1 at this time does not recognize that the inconsistency is generated. As described above, the reason for that is that when the HDD 14 is controlled from outside by the USB mass storage class, the application on the digital video camera 1 side does not execute the management control on the HDD 14.

If a normal operation is executed while the digital video camera 1 does not recognize the inconsistency in this manner, a malfunction may be caused, or an inappropriate file management situation may be presented, thereby probably resulting in disturbing the user, and hence, inconvenient.

For example, provided that an index display of the content file is performed under a management state shown in FIG. 5B.

In this case, the management file side manages based on assumption that the content file B is stored on the HDD 14. Therefore, the index display shows a state where the content file B is stored on the HDD 14 and it is possible to normally play back. However, eve when a content file C is designated from the index display to instruct to play back the content file C, the content file B is already deleted on the file system, and thus, it is not possible to access the content file B of the HDD 14, resulting in a playback error. Such a playback error disturbs the user, and in some cases, an error of a device operation is easily caused such as a hung-up of the digital video camera 1.

Therefore, in the embodiment, a configuration described below to avoid such inconvenience is adopted.

Firstly, a flowchart in FIG. 6 shows a process procedure regarding the management file corresponding to a case where a content file obtained by imaging and so on is newly recorded when the digital video camera 1 operates as a single unit.

The process shown in FIG. 6 is realized when a hardware device having a program executing function such as the CPU 10 executes a program, which is the software layer (the application, the management-file controlling system, the file system, and the device driver) show in FIG. 2. Such a program is stored in the ROM 11, the non-volatile memory 12a, the HDD 14, or the like, for example. Alternatively, it may be also possible that the program is firstly stored in a removable storage medium, for example, and thereafter, the storage medium is used to install the program so that the digital still camera 1 may store it. Another possibility is that the program is stored in a storage device in a server or the like on a network, and the program is downloaded via the network for acquisition, and thereby, the program is installed to the digital still camera 1. This holds true of flowcharts in FIGS. 7, 9, 10, and 12, which are described later.

In FIG. 6, firstly, at step S101, the content file is newly recorded on the HDD 14. Processes at the step S101 includes control for transferring actual data forming the content file to be newly recorded to the HDD 14 for data writing, and rewriting of the file-system management information (directory entry, FAT) according to a result of the data writing on the HDD 14.

As a result of the step S101, a managed state in which the content file is newly recorded on the file system is obtained, and then, at subsequent steps S102 and S103, the content file in which new record is performed is registered in the management file. Thus, at the step S102, information of the content file newly recorded this time is registered in the management file. Specifically, various required information about the newly recorded content file is collected to create a file entry, and the created file entry is added to a structure of the property file shown in FIG. 3. When the metadata, which is optionally set, is set to be valid, information as the metadata about the newly recorded content file is collected to create a metadata slot, and added to a structure of the metadata file at the step S102.

In the embodiment, an optional thumbnail file is effectively set. In a case of the embodiment, the thumbnail image data stored by the thumbnail file is utilized for the index display on the display 7. That is, in the index display of the embodiment, each content files is displayed by the thumbnail image, and for the thumbnail image display, the thumbnail image data of the thumbnail file is utilized.

Therefore, at the step S103, the data of the content file newly recorded is utilized to create the thumbnail image data to the thumbnail file in the management file, and the thumbnail image data is converted into a format of the thumbnail slot style supported by the newly recorded content file, and in addition, added to the thumbnail file.

Herein, in the embodiment, the management file is structured to share predetermined information items owned by the file-system management information.

Specifically, as is known, the FAT, which is a file system to which the embodiment corresponds, has information items such as a file name, a file size, a date and time of creation, and a date and time of updating in a directory entry structure defined as entry information by each directory (file). The management file of the embodiment also has the information items such as the file name, the file size, the date and time of creation, and the date and time of updating, as shown in the file entry structure in the property file. In this manner, the embodiment is configured to have the four information items such as the file name, the file size, the date and time of creation, and the date and time of updating, which are shared by the file system, in the information items forming the management file. In the descriptions below, the four information items shared by the management file and the file-system management information are referred to as "common information items".

Subsequently, a description is given of a configuration for performing the index display about the content files on the display 7 by the digital video camera 1.

Figure 8:
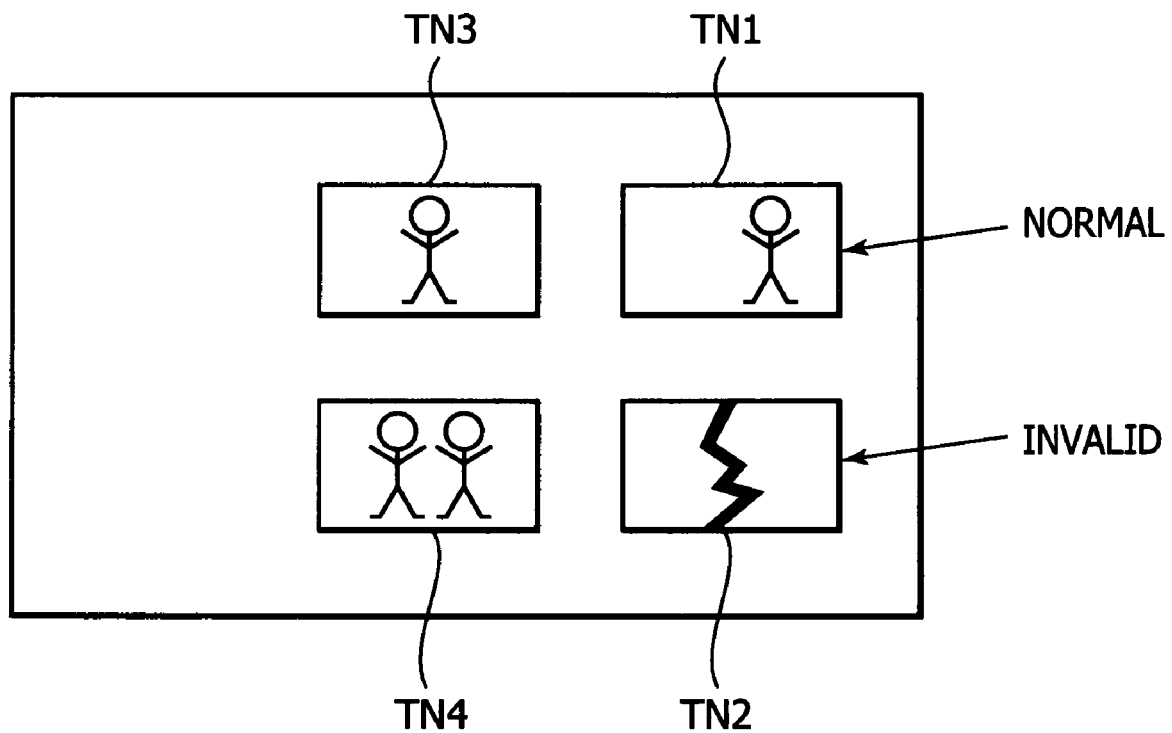
FIG. 8 is a diagram showing an example of an index display mode.

As described above, the index display of the content file is to present the information about the content file stored on the HDD 14 in an index manner, and as an example of a display mode, it may be possible to display in a manner that at least thumbnail images (TN1 to TN4) are presented as an index content about each content file, as shown in FIG. 8.

Figure 7:
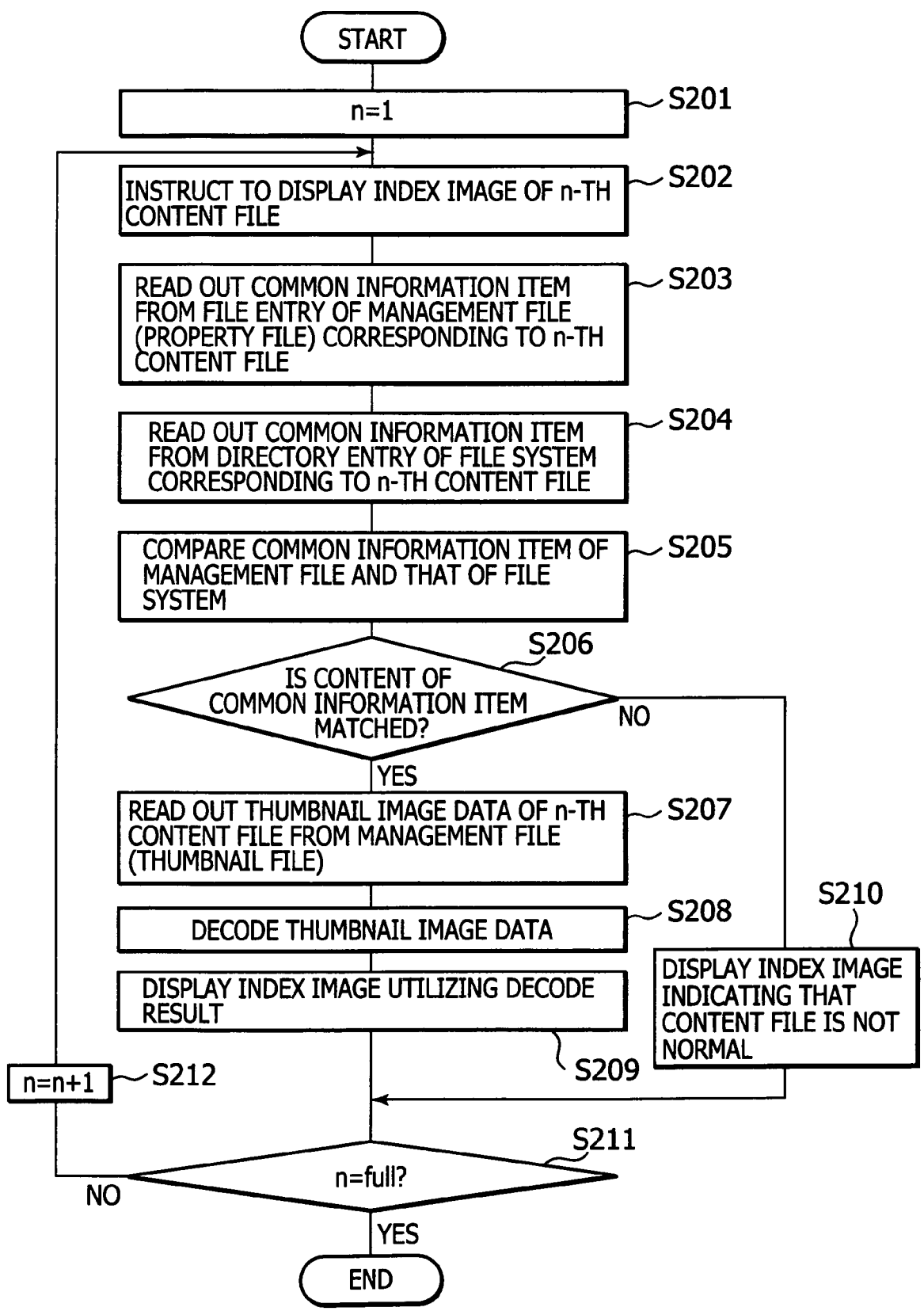
FIG. 7 is a flowchart showing an example of a process procedure for an index display in the digital video camera of the embodiment.

FIG. 7 shows an example of a process procedure, as the embodiment, for the index display.

In this case, as shown at step S201, a variable n is firstly initialized as n=1. The variable n indicates a display order about the content files displayed as the thumbnail image within a screen in the index display. The display order is determined based on predetermined management information items in the management file. As an example, when an ID or the like is added in a manner to associate with each file entry, the display order may be determined based on the ID.

At step S202, a display instruction of an index image of an n-th content file is issued. The index image used herein means an image portion in which a content associated with each content file in the index display is displayed. FIG. 8 shows, as a display example of the index image, thumbnail images associated with the content files.

At step S203, from the file entry corresponding to the n-th content file in the property file of the management file, the common item information (the file name, the file size, the date and time of creation, and the date and time of updating) is read out. At subsequent step S204, a directory entry corresponding to the n-th content file in the file-system management information is accessed, and similarly, reading out of the common item information is executed.

Subsequently, at following step S205, a content of the common item information of the management file read out at the step S203 and that of the common item information of the file system read out at the step S204 are compared.

At step S206, as a result of the comparing process at the step S205, it is determined whether the contents of the both common item information match.

At this time, when the contents of the common item information do not match, specifically, it specifically means that at least one of the common item information such as the file name, the file size, the date and time of creation, and the date and time of updating does not match.

Firstly, examples of causes for a mismatch of the file names may include a case where in a state that the digital video camera 1 and the external information processing apparatus such as a personal computer are connected by the USB mass storage class, for example, and an operation of changing the file name is performed by the external information processing apparatus. This case results in a mode of an inconsistent state shown in FIG. 5C, where in the file-system management information, the updating which matches the change of the file name is performed, but on the management file side, a state where the change of the file name is not reflected and the management by the file name yet to be changed still remains is generated.

Further, a typical cause for a mismatch of the file sizes may include a case where a modification operation for an editing of the content of the content file is performed by the external information processing apparatus, and in addition, the content is re-saved. This case results in a mode of the inconsistent state shown in FIG. 5C, where the file size modified corresponding to the editing is reflected on the file system, but the management file side is in a state where the management by the file size yet to be changed still remains.

Examples of causes for a mismatch of the date and time of creation may include a case where a copying task of the content file which should not essentially be performed is performed by the external information processing apparatus, for example, and thus, the date and time of creation is updated on the file system, but the management file side is in a state where the management by showing the date and time of creation yet to be copied still remains.

Examples of typical causes for a mismatch of the date and time of updating may include a case where a certain modification about the content of the content file is performed by the external information processing apparatus and the content is re-saved, and thus, the date and time is updated on the file system, but the management file side is in a state where the management by showing the date and time of updating yet to be modified still remains.

Further, as shown in FIG. 5B, when the content file is deleted by the external information processing apparatus, a result of the deletion is reflected on the file system. However, when the management file side is in a state of managing as if the content file is not deleted and remains, the common item information of the content file on the file system side is not to exist. Therefore, in this case also, a relationship in which the common information items do not match between the file-system management information side and the management file side is generated.

When the common information items thus do not match between the file-system management information and the management file, this indicates that a certain form of inconsistency about the both management contents is generated. Therefore, it may be possible to say that the process in which the contents of the common information items are compared to determine whether they match at the steps S205 and S206 is, that is, a process for determining the consistency between the file-system management information and the management file.

At the step S206, when the common information items of the both match, and thus, a positive determination result is obtained, processes of steps S207 to S209 are executed.

Firstly, at the step S207, reading out the thumbnail image data associated with the n-th content file is executed. That is, the thumbnail slot associated with the n-th content file is searched from the thumbnail files in the management file, and reading out the thumbnail image data stored in the searched thumbnail slot is executed. The thumbnail image data thus read out is, as a result, thumbnail image data indicating the n-th content file. Therefore, at the subsequent step S208, a decoding process for displaying and outputting the thumbnail image data obtained by reading out at the step S207 is executed. At the subsequent step S209, a result of decoding the thumbnail image data (display-use image data of the thumbnail image) at the step S208 is utilized to display such that the index image about the n-th content file is disposed in an appropriate location within the screen as the index display.

The index display displayed according to the procedure at steps S207 to S209 is adapted to include thumbnail images in a normal state in which representative images of the associated content files are reduced, in a manner as shown in thumbnail images TN1, TN3, TN4, or the like in FIG. 8, for example.

In contrary, when the contents of the common information items do not match, and thus, a negative determination result is obtained at the step S206, a process at step S210 is executed.

At the step S210, an index image of the n-th content file is displayed as a thumbnail image TN2 in FIG. 8, for example, in a pattern or a design of a state where the image thereof is ruptured. The design of the index image indicates that a normal playback may not be possible because a state of the data and a file management of the associated content file are invalid. That is, at the step S210, the index image is displayed in a manner that the n-th content file is not normal is indicated by a predetermined display mode.

After the process at the step S209 or step S210 is executed, a determination is made as to whether the variable n reaches a predetermined maximum value full at step S211. When the variable n reaches the maximum value full, it means that a display of all index images to be disposed within the index display of one screen displayed on the display 7 is completed. Therefore, when it is determined that an index image to be disposed within the index display still remains and a negative determination result is obtained at the step S211, the variable n is incremented by one at step S212, and the process returns to the process of the step S202. Thereby, a procedure for the index image display of the subsequent content file is begun. In contrary, when a positive determination result is obtained at the step S202, this means that the index display of one screen is completed, and thus, the process exits from the process shown in FIG. 7.

Figure 9:
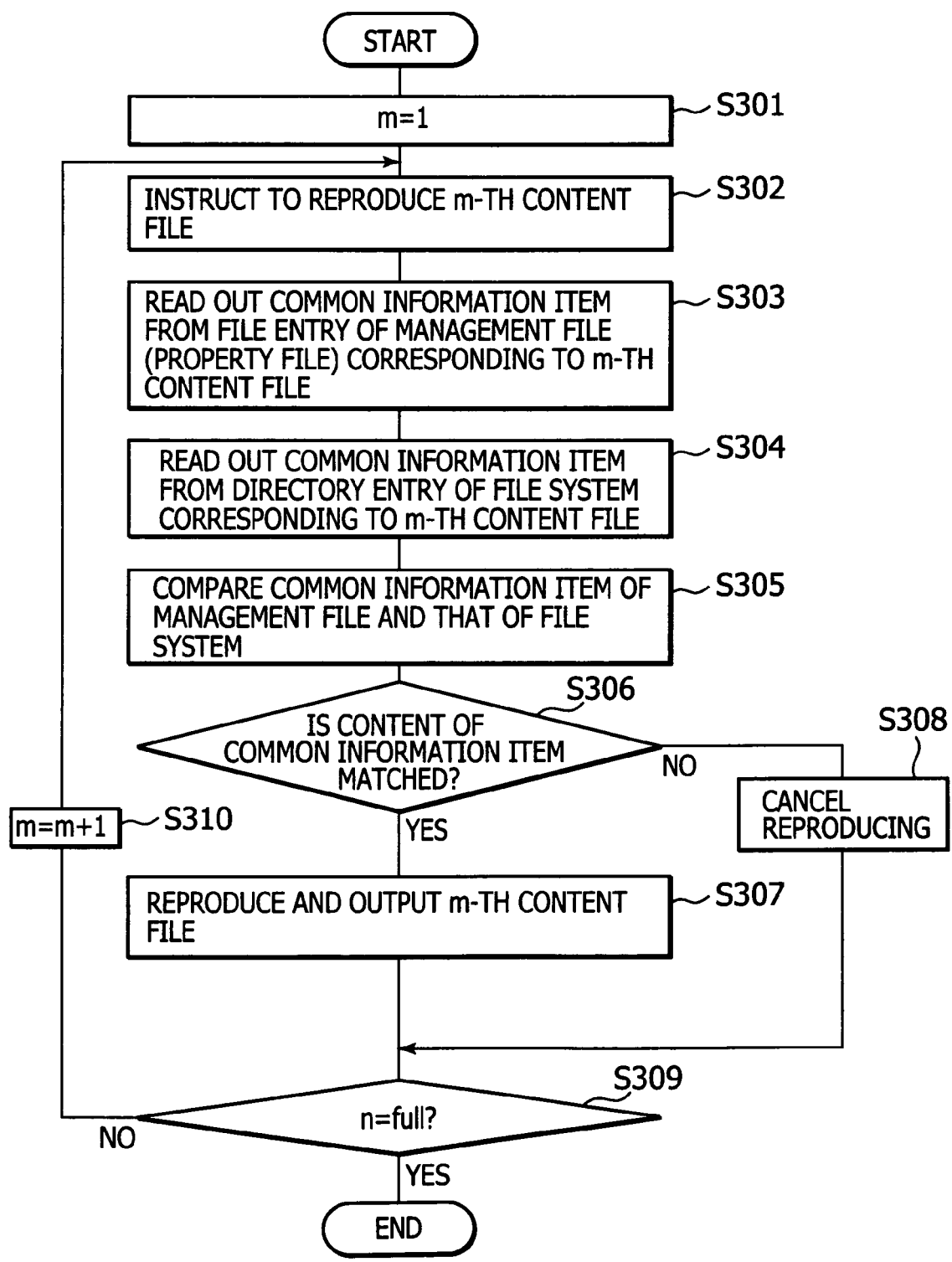
FIG. 9 is a flowchart showing an example of a process operation for playing back and outputting a content file as an embodiment.

Subsequently, with reference to a flowchart in FIG. 9, a description is given of an example of a process procedure for playing back and outputting the content file by the digital video camera 1 of the embodiment. A process shown in FIG. 9 shows a procedure at the time that the content files stored on the HDD 14 are sequentially played back according to a playback order set according to a predetermined rule.

Firstly, in this case, a variable m is initialized as m=1 at step S301. The variable m indicates the playback order of the content files. As described above, the playback order of the content files is set according to the predetermined rule. The setting of the playback order may be determined based on the file-system management information or predetermined management information items in the management file. For example, it may be possible to consider that on the assumption that a file is named in a manner to include a content of a serial number that follows a recording order into the HDD 14, the playback order is set based on the file name. Alternatively, similarly to the case of the above-described index display, it may be also possible to consider to set the playback order based on another management information item such as an ID assigned to the file entry, etc.

At step S302, an instruction for playing back and outputting an m-th content file is issued.

Processes from step S303 to S306 executed in response to the above-described instruction issuance are similar to those at the steps S203 to S206 described in FIG. 7, and thus, the description therefor is omitted at this time.

At the step S306, when the common information items of the both match, and thus, a positive determination result is obtained, a control process for playing back and outputting by reading out actual data of the m-th content file from the HDD 14 is executed at step S307. As a result, the content file is normally played back and outputted.

On the other hand, at the step S306, when the common information items of the both do not match, and thus, a negative determination result is obtained, the process regarding playing back and outputting the m-th content file is canceled at step S308. That is, the content file managed under an inconsistent state is not played back.

Herein, according to the description in FIG. 7, regarding the content file in which it is determined at the step S206 that the common information items do not match, the index image (see FIG. 8) indicating that the content file is not normal (invalid) is displayed at the step S210. That is, according to a procedure in FIG. 10, the content file in which the index image indicating that the content file is not normal is displayed in the index display is not played back. That is, the index image indicating that the content file is not normal (invalid) in the embodiment also means unplaybackability.

After the process at step S307 or step S308 is executed, similarly to the steps S211 and S212 in the foregoing FIG. 7, a determination as to whether the variable m reaches the predetermined maximum value full is made at step S309, and when a negative determination result is obtained, the variable m is incremented by one at step S310, and the process returns to the step S302. Thereby, an operation in which the content files are sequentially played back according to the playback order is obtained. Besides, when the step S308 is executed and the process returns via the steps S309 and S310 to the step S302, a process flow is obtained in which a playback of an unplaybackable content file is skipped, and then, a procedure of playing back the subsequent content file is reached.

Subsequently, when a positive determination result is obtained at the step S309, the process exits from the process shown in FIG. 9.

Herein, according to the description described above, the digital video camera 1 of the embodiment is adapted such that a consistency check regarding the content file management is executed by utilizing an occasion in which the index display is performed or an occasion in which the content file is played back. The reason for that is as follows:

For example, when the digital video camera 1 is connected to the external information processing apparatus by the USB mass storage class, a file operation is performed on the HDD 14 by the external information processing apparatus, and as a result, inconsistency is generated. Even in this situation, a trouble resulting from the inconsistency does not always become apparent immediately after the USB connection is cut. It may be that a certain form of phenomenon as a trouble becomes apparent only when an operation that accompanies the use of the file system or the management information of the management file is executed. The index display, and playback and output of the content file in the embodiment is none other than a process in which the management file and the file-system management information are utilized. In view of this, the embodiment is adapted such that as shown in FIG. 7 and FIG. 9, the consistency check is executed as a process at the time of the index image display in the index display, or a process at the time of playing back and outputting the content file.

For example, when the connection by the USB mass storage class is cut, it becomes necessary to check whether the inconsistency is generated by the content file operation of the external information processing apparatus. The reason for that is that to stabilize a system operation, the system operation after the USB connection is cut is to be started after the consistency check is completed.

However, when the configuration of the embodiment is adopted, firstly, it may become unnecessary to perform the consistency check at every timing after the USB connection is cut. Secondly, when performing the consistency check, it may become unnecessary again to access all content files all at once. Thereby, in the embodiment, a time required for the consistency check is significantly shortened, and in particular, a starting time after the USB connection is cut is shortened.

In the embodiment, at the time of the index display, the common information items are compared as the consistency check in each process of the index image associated with the content file to be displayed in one screen on the display 7. That is, for example, in the consistency check for the index display of one screen, only comparing processes of the common information items of which number of times corresponds to a number of index images (content files) to be disposed within the index display may be executed, and it may not be always necessary to execute the comparing processes of the common information items about all the content files stored and managed all at once. As a result, a process load at the time of the index display is not heavier than necessary, and a total time required for the display may be reduced to a certain time or less.

Further, when the content files are played back and outputted, the comparison of the common information items only about a content file subject to playback is executed at each time that one content file is started to play back, and thus, the comparison processes of the common information items about all the content files are not executed all at once. Since a time required for the comparison process of the common information items executed at each time that the content file is played back is very short, a waiting time until the playback of the content file is begun is not particularly long.

In a technique for the consistency check of the embodiment, the content file stored on the HDD 14 is not accessed. However, a required number of information items in the file-system management information (directory entry) and the management file is utilized. As a result, an access time or the like to the HDD 14 at the time of processing the consistency check is also shortened. This also greatly attributes to shortening a process time required for the consistency check.

Incidentally, in a personal computer in which Windows XP (registered trademark) is installed as operating software (OS), when a property screen about a still image file or the like such as a JPEG format, for example, is accessed, an "Overview" tab is also displayed in addition to a "General" tab. In the "Overview" tab, which is newly created after the OS of Windows is updated to Windows XP, additional information such as a title, a subject, an author, a category, keywords, comments, etc., may be inputted for registration.

Although it depends upon a version of Windows XP, the following instances are confirmed regarding the "Overview" tab.

Provided that a property window about a certain still-picture file is accessed, and further, an "Overview" tab in the property window is clicked to display in the foreground a window screen of the "Overview" in which various input boxes are displayed, and thereafter, as an operation that follows, nothing is inputted in the input box in particular, and an OK button is clicked to close the window screen of the "Overview". As a result, the operation of the OK button is regarded as some form of updating about the "Overview", and by a process of a file system which is mounted in Windows XP, a result in which the date and time of updating and the file size of file-system management information are changed is generated.

It is noted that in the description that follows, the operation on the window screen of the "Overview" is referred to as an "instance operation".

Generally, when operating a personal computer, as in the above-described instance operation, there occurs a case where instead of a cancel button, the OK button is clicked to close the window when no particular change is made to a setting content or the like within a certain window. The reason for this is that in such a case, as long as no change is made to the setting content within the window, the content re-registered by clicking the OK button consequently remains the same as before, and the user understands this.

Judging from this, as far as the above-described instance operation is concerned, if the OK button is clicked as usual to close the window screen even when the user makes no particular change to the content within the window screen, there occurs somewhat special result in which the date and time of updating and the file size of the file-system management information are changed (updated) without user's intention.

However, as far as the still-picture file stored on the HDD or the like of the personal computer, for example, is concerned, even when the updating of the date and time of updating and the file size described above is performed, the updating is performed by the file system itself mounted in the personal computer, and a file management subsequent thereto performs the same file system (that is, the file management is completed in the personal computer), and thus, the consistency of the file management content is retained.

However, under an environment where the personal computer and the digital video camera 1 of the embodiment are connected vie the USB by the USB mass storage class, and the above-described instance operation is performed, that is, when a property screen of a certain still-picture file stored on the HDD 14 of the digital video camera 1 connected via USB is accessed on the personal computer side, and the screen is closed by a click operation of the OK button, the following inconvenience is generated as a result of the updated date and time and the file size:

That is, in the configuration of the embodiment described above, the four information items, which is the common item information, such as the file name, the file size, the date and time of creation, and the date and time of updating are compared between the management file and the file-system management information, and when at least one item does not match, it is considered as a whole that the inconsistency is generated in the management contents between the management file and the file system about the file. As a result, it is set as unplaybackable, for example. Therefore, it is determined that out of the still-picture files stored on the HDD 14, a file of which date and time of updating and file size of the file-management information are changed by the above-described instance, the inconsistency is generated, and thus, unplaybackability is set. The reason why the still-picture file results in the inconsistency is that the corresponding property screen is merely accessed and closed. Thus, a state of inconsistency in a real sense such that an error is caused in an operation of the digital video camera 1 is not generated. As described above, when a change setting is not particularly made to the window screen of the "Overview" and the OK button is clicked to close the window, the user is not conscious of any change made to the still-picture file. Notwithstanding, when the unplaybackability is set on the grounds of the inconsistency, the user is not able to specify the cause for the unplaybackability, for example, thereby causing a disturbance without good reason such as the user may misunderstand that this incidence is a breakdown, for example.

Therefore, in the embodiment, a configuration described below is adopted to take measures against the above-described instance. The configuration described below is to be treated as another embodiment based on the foregoing embodiment. The contents described above with reference to FIG. 1 to FIG. 6 in another embodiment are similar to those of the foregoing embodiment.

Figure 10:
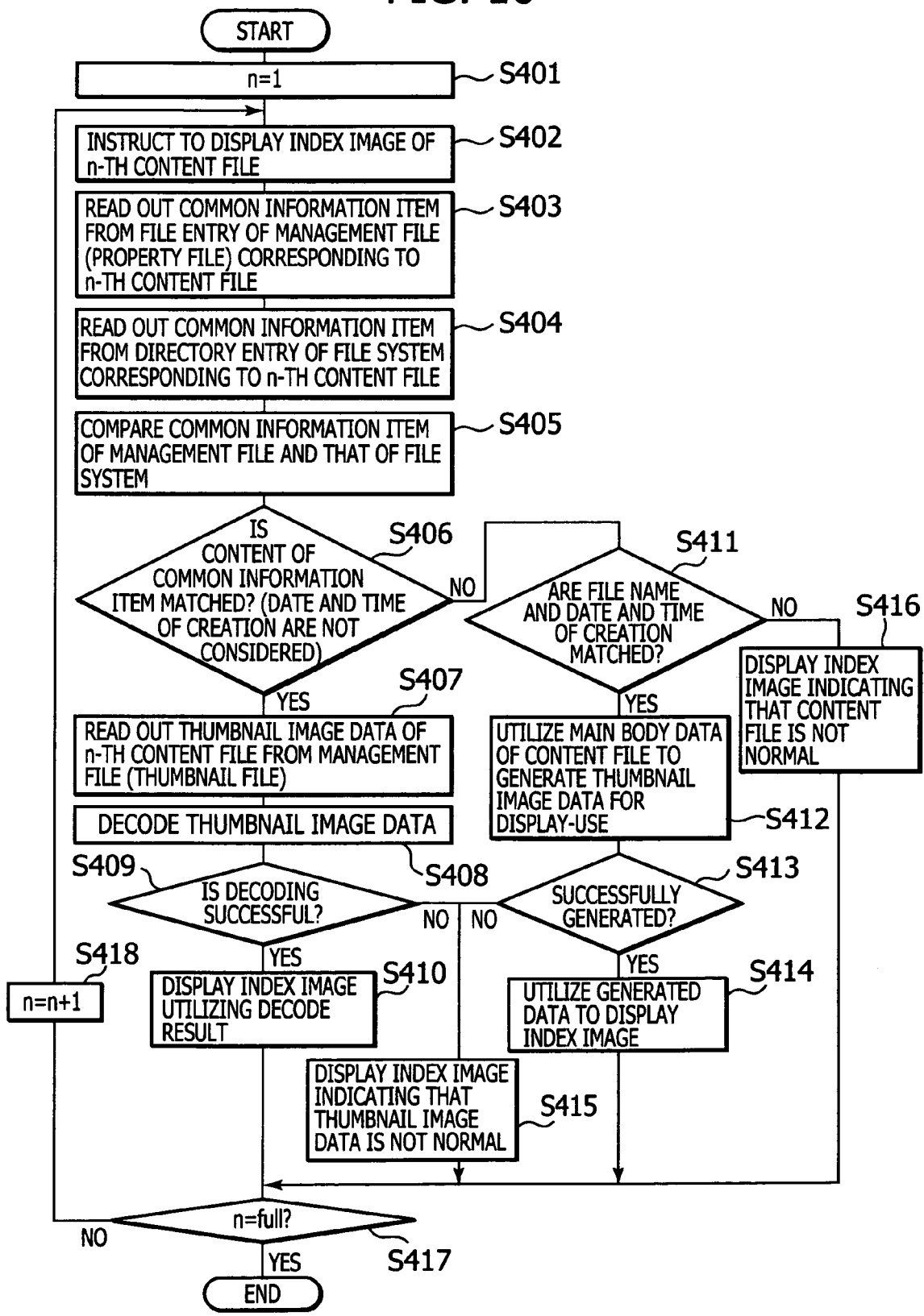
FIG. 10 is a flowchart showing an example of a procedure for an index display as an embodiment.

Firstly, with reference to a flowchart of FIG. 10, an example of a process procedure for the index display is described as another embodiment.

In FIG. 10, first procedures from steps S401 to S406 are similar to those of the steps S201 to S206 in FIG. 7. Further, procedures of steps S407 and S408, which are executed when a positive determination result is obtained at step S406, are similar to those of the steps S207 and S208 in FIG. 7.

In this case, by step S409 that follows the step S408, it is determined whether a decoding process of the thumbnail image data at the step S408 is successful. Herein, when the decoding process is successful and a positive determination result is obtained, the process advances to step S410. At the step S410, similar to the step S209 in FIG. 7, the display-use image data of the thumbnail image, which is a result of the decoding, is utilized to dispose and display the index image about the n-th content file in a required location within the index display screen.

On the other hand, when the decoding process is unsuccessful and a negative determination result is obtained at the step S409, that is, the thumbnail image data cannot be decoded due to a certain reason such as the thumbnail image data only is destructed, for example. However, this is a situation where consistency about the n-th file is established. Therefore, in this case, the process advances to step S415 to display an index image indicating that the "thumbnail image data" is not normal is displayed, as the index image about the n-th file, instead of the "content file". When the "thumbnail image data" is not normal, that is, more specifically, this means a situation where the decoding process for playing back and outputting results in error because the actual data of the thumbnail image data is destructed, for example.

Figure 11:
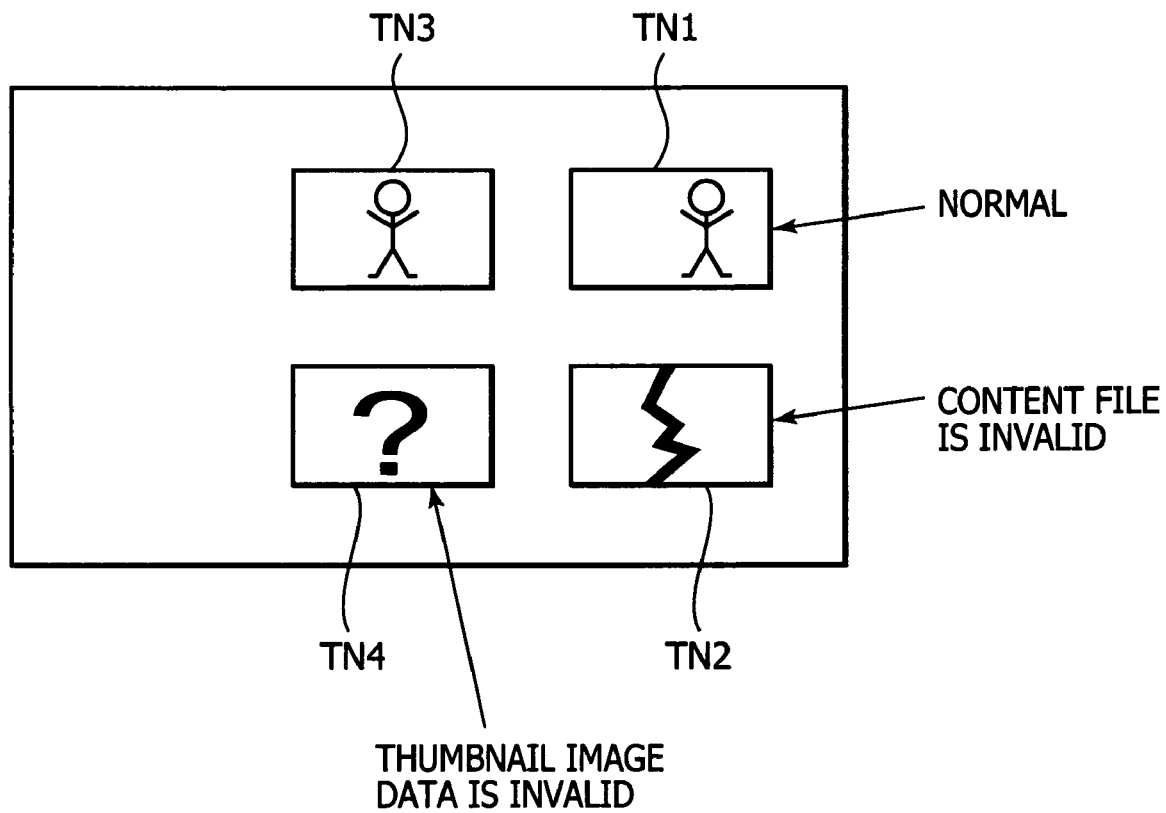
FIG. 11 is a diagram showing an example of another index display mode.

Examples of index images indicating that the "thumbnail image data" is not normal may include a mode where a question mark is presented as shown in a thumbnail image TN4 in FIG. 11. When the user views the index image, the user is able to recognize that the thumbnail image about the file associated with the thumbnail image TN4 may not be displayed due to some trouble, but the file itself is capable of being played back.

When the contents of the common item information do not match, and thus, a negative determination result is obtained at the step S406, a determination process at step S411 is executed.

When the negative determination result is obtained at the step S406, at least one of the four common item information, such as the file name, the file size, the date and time of creation, and the date and time of updating, does not match. Herein, only the date and time of updating and the file size are updated and rewritten by the instance operation about the window screen of the "Overview" in the foregoing property screen. Therefore, if, as a state of mismatch in the four common item information is reached, only the date and time of updating and the file size do not match and the remaining file name and date and time of creation match, it may be possible to assume that this state is mismatch of the contents of the common item information because of a result in which the instance operation about the window screen of the "Overview" is performed.

Therefore, at the step S411, to determine whether the mismatch of contents of the common item information determined at the step S406 of this time results from the result obtained by performing the instance operation about the window screen of the "Overview", it is determined whether both of the file name and the date and time of creation are in a state of matching. In other words, the determination result determines whether "only either one of the date and time of updating and the file size do not match, and all the remaining common item information match". The date and time of updating and the file size may be thus rewritten by the instance operation, and thus, as a content state of the common item information, "both the date and time of updating and the file size do not match and all the remaining common item information match" is established. As a result, this does not correspond to the determination process described above. However, in the embodiment, it is considered that only either one of the date and time of updating and the file size may be written by the instance operation due to some reasons, and the step S411 follows this way of thinking.

When the positive determination result is obtained at the step S411, the process advances to step S412.

At the step S412, the thumbnail image data is not utilized, but main body data (actual data) of the n-th file, which is subject to current processing, is utilized to generate the display-use thumbnail image data. A format of the display-use thumbnail image data is the same as that of the display-use data of the thumbnail image obtained by decoding the thumbnail image data at the step S408, for example.

When the process reaches the step S412, it means that it is highly probable that the inconsistency resulting from the instance operation is generated, but it may not be possible to deny that the inconsistency is generated resulting from other than the instance operation. In the case where the inconsistency is generated resulting from other than the instance operation, and the thumbnail image data is decoded as at the step S408 to display the display-use thumbnail image data as the index image, it may become probable that an image content shown by the index image and that obtained by playing back the main body data of the file differ (i.e., the inconsistency is generated) because the main body data of the file is rewritten due to some reasons, for example. Since such a probability may be possible, when the process reaches the step S412, it is considered preferable that the above-described display-use thumbnail image data be not displayed as the index image. Therefore, at the step S412, to generate the display-use thumbnail image data, the data of the file main body is utilized, thereby obtaining proper thumbnail image data associated with the current n-th file.

At step S413, it is determined whether the generation of the display-use thumbnail image data at the step S412 is successful, and when a positive determination result is herein obtained, the process advances to step S414.

At the step S414, the display-use thumbnail image data generated at the step S412 is utilized to dispose and display the index image about the n-th content file in the required location within the index display screen.

When a negative determination result is obtained at the step S413, the process advances to the step S415, similarly to the case where the negative determination result is obtained at the step S409, to display an index image indicating that the thumbnail image data is not normal.

When the negative determination result is obtained at the step S411, it is assumed that the inconsistent state is generated resulting from a factor other than the instance operation. Therefore, in this case, similarly to the case where the step S210 is executed when the negative determination result is obtained at the step S206 in FIG. 7, the index image (the thumbnail image TN2 in FIG. 8) indicating that the n-th content file is not normal at step S416.

Step S417 after the procedures of the steps S410, S414, S415, and S416 are completed and step S418 when the negative determination result is obtained by the step S417 are similar to those of steps S211 and S212 in FIG. 7.

The process shown in FIG. 10 is thus executed, regarding a content file in which at least only one of the file size and the date and time of updating, out of the four common item information (the file name, the file size, the date and time of creation, and the date and time of updating), does not match, that is, a content file in which it is assumed that the inconsistency of the common item information is generated resulting from the foregoing instance operation, the thumbnail image data is generated at the step S412, and unless the generation is unsuccessful, the thumbnail image data is displayed as the index image at the step S414. This means that there is a policy set forth such that a file in which it is assumed that the inconsistency of the common item information is generated resulting from the instance operation is not treated as unplayable. Thereby, it may become possible to avoid inconvenience, as described above, resulting from an operation in which the unplaybackability is set to the file in which the file-system management information is rewritten resulting from the instance operation.

Subsequently, with reference to a flowchart in FIG. 12, a description is given of an example of a process procedure for playing back and outputting the content file of another embodiment. In the process shown in FIG. 12, similar to the case of the process procedure in FIG. 9 in the foregoing embodiment, a procedure in which the content files stored on the HDD 14 are sequentially played back according to a playback order set according to a predetermined rule is shown.

Figure 12:
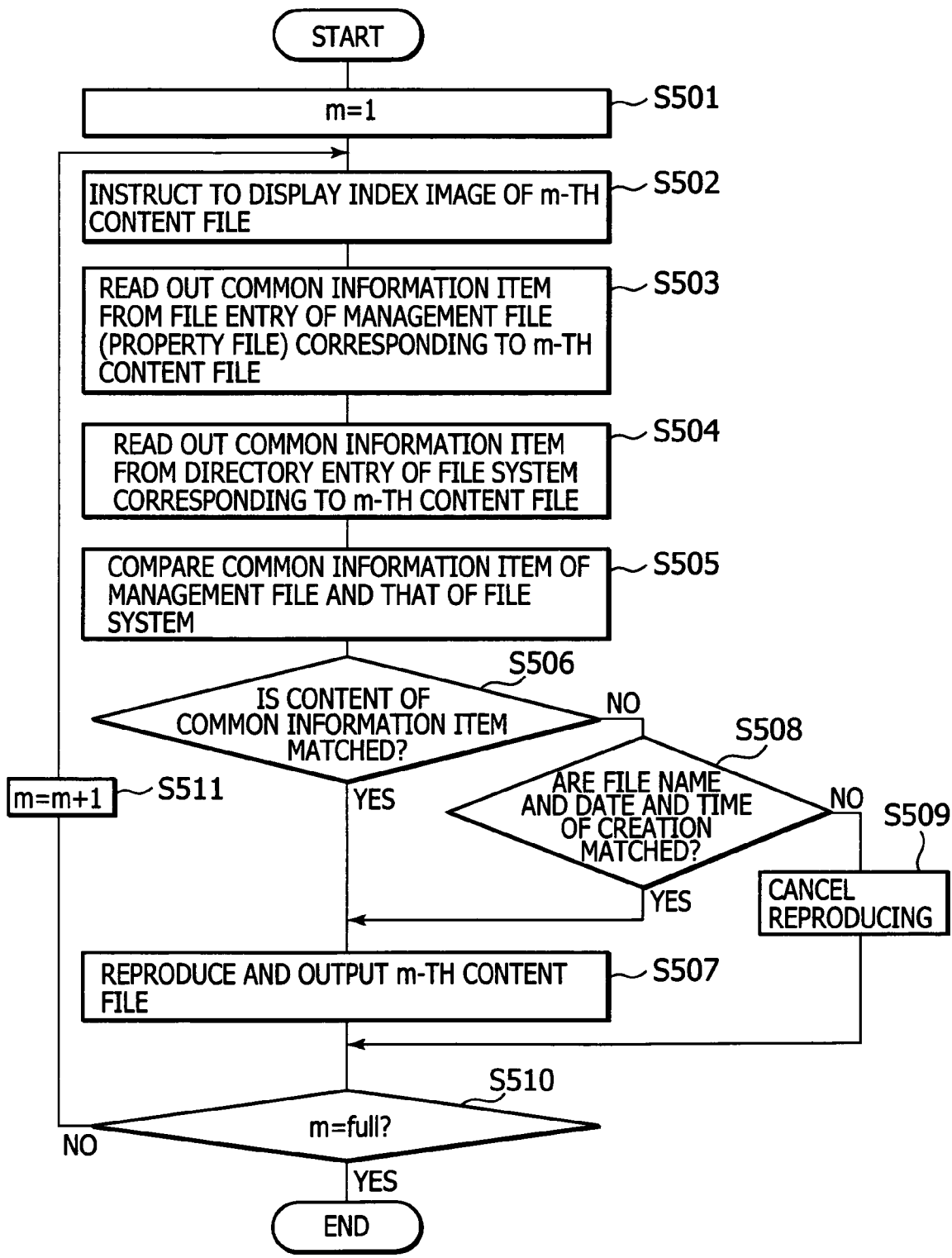
FIG. 12 is a flowchart showing an example of a process operation for playing back and outputting a content file as another embodiment.

In FIG. 12, firstly, procedures from step S501 to S506 are similar to those of the step S301 to S306 in FIG. 9.

At the step S506, when all contents of the four common item information (the file name, the file size, the date and time of creation, and the date and time of updating) match and a positive determination result is obtained, the process advances to step S507 to execute a control process for playing back and outputting the actual data of the m-th content file by reading out from the HDD 14, similar to the step S307 in FIG. 9. That is, a normal playback is executed on the content files.

In contrary, when any one of the common item information does not match and a negative determination result is obtained at the step S506, the process advances to step S508.

At the step S508, similar to the step S411 in FIG. 10, it is determined whether both the file name and the date and time of creation are in a state of matching. That is, it is determined whether the mismatch of contents of the common item information results from the instance operation.

As described above, the other embodiment takes a stance that in the inconsistency between the management file and the file management information generated from the result of the instance operation, the unplaybackability should not be set. Therefore, when a positive determination result is obtained at the step S508, that is, when it is assumed that the inconsistency of the m-th file results from the instance operation, the process advances to the step S507 to execute the playback of the m-th file.

On the other hand, when a negative determination result is obtained at the step S508, that is, when it is assumed that the inconsistency of the m-th file results from other than the instance operation, the process advances to step S509 to cancel the process relating to the playback and output of the m-th content file.

Thus, in the other embodiment, the content file in which the management state is inconsistent resulting from the foregoing instance operation is not rendered unplaybackable, but the playback is performed.

Now, a relationship between setting of playbackability of the content file by the process in the foregoing FIG. 12 and the index display by the process in FIG. 10 is considered, the content file which is played back and outputted at the step S507 in FIG. 12 is a content file in which the index image is displayed by the thumbnail image data read out from the management file (thumbnail file) at the step S410 in FIG. 10, or a content file in which the index image is displayed by the thumbnail image data generated by utilizing the main body data (actual data) of the content file at the step S414, or a content file in which the index image indicating that the thumbnail image data is not normal is displayed by the step S415. That is, in the other embodiment, when the thumbnail image is displayed as the index image, this indicates that the associated content file is playbackable even if its original thumbnail image data is read out from the management file or it is generated from the actual data of the content file. It further indicates that as the index image indicating that the thumbnail image data is not normal, the thumbnail image may not be displayed resulting from a certain trouble, but as far as the reproducibility of the content file is concerned, a playback is available. Further, when the positive determination result is obtained at the step S411, the index image by the thumbnail image by either one of the steps S414 and S415, or the index image indicating that the thumbnail image data is not normal is displayed. That is, a content file in which it is assumed that the contents of the common item information do not match as a result of the foregoing instance operation is set as a content file to be played back and outputted (playbackable) according to the policy described above.

It is noted that in the playback control procedure of the content files shown in the above-described FIG. 12 and in the foregoing FIG. 9, the content files are automatically played back according to a predetermined order in a sequential manner. However, when the content file subject to playback is selected one by one and the playback is begun, if the procedures from the steps S503 to S509, or those in the steps S303 to S308 are executed before the playback process is begun, it may become possible to set playbackability of the selected content file.

In the digital video camera 1 of the embodiment, both the consistency check at the time of the index display shown in FIG. 7 and that at the time of playing back and outputting the content files are used. However, it may be possible to configure such that only either one of the consistency checks is adopted in some cases, for example, for the sake of a specification about an operation of the device.

The present invention is not limited to the configurations described so far as the embodiments.

For example, in the embodiments, the common information items used for the consistency check include a combination of the file name, the file size, the date and time of creation, and the date and time of updating, but another combination in which the number of items is smaller or larger may be adopted. Further, the other embodiment may be configured to correspond to another similar instances, and according thereto, it may be possible to appropriately change a condition setting about a content state of matching or mismatching of the common item information of the content file to be treated as playbackable even if the common item information does not match.

Further, a management mode based on the file system about the management file (and the backup file), and a format, specifications, etc., of the management file may include other than those described in FIG. 2 and FIG. 3. In the embodiment, based on the management file, the content files of which information content includes an image, sound, etc., are managed. However, types of files to be managed by the management file are not particularly limited. For example, a document file may be included. Further, in some uses of an actual device, it may be probable that files of specific types, which are subject to management of the management file match those of all types managed by the file system (basic file management means). Further, along therewith, a device to which the invention of the subject application is applied is not limited to a digital video camera, and may be applicable to other various types of devices.

As described above, the present invention is capable of avoiding the inconvenience in that a starting time becomes long due to a process for determining consistency, for example. Further, a result of the consistency determination is reflected on an operation of the device such as an index display, a playback and output, and so on, and thus, it may become also possible to appropriately eliminate malfunction resulting from the inconsistency. Thus, in the invention of the subject application, measures against the inconsistency between the basic file management and the file management based on the management file is effectively taken.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus, comprising:
a processor, including:
means for managing files stored on a storage medium which are adapted to share predetermined management-use information items of a file system, at least one of the management-use information items being associated with a specific one of the files stored on the storage medium, the management-use information items being stored in a management file stored on the same storage medium that stores the specific one of the files,
means for managing the specific one of the files stored on the storage medium using basic-file management information about that file which is separate from the predetermined management-use information items of the file system and which is stored in a non-volatile memory, other than the storage medium that stores the specific one of the files and the management file, within the information processing apparatus,
means for comparing, when performing an index display in which the specific file stored in the storage medium is displayed in an index style, contents of common item information of the at least one management-use information item of the file system that is associated with the specific file and stored in the management file stored on the same storage medium that stores the specific file and contents of common item information of the basic-file management information about the specific file stored in the non-volatile memory within the information processing apparatus, and
means for executing the index display such that a comparison result by the means for comparing is reflected.

2. The information processing apparatus according to claim 1, wherein:
the means for executing the index display executes a display to indicate in the index display an inability to playback the specific file when the contents of the common item information of the at least one of the management-use information items of the file system does not match the contents of the common item information of the basic-file management information about the specific file based on the comparison result by the means for comparing.

3. The information processing apparatus according to claim 1, wherein:
the means for executing the index display executes, based on the comparison result by the means for comparing, a display to indicate capability to playback the specific file when the contents of the common item information of the at least one of the predetermined management-use information item of the file system matches the content of the basic-file management information about the specific file.

4. The information processing apparatus according to claim 3, wherein:
when displaying to indicate in the index display the capability to playback the specific file, the means for executing the index display displays and outputs, as an image, thumbnail image data which is generated using actual data of the specific file instead of using thumbnail image data stored in a storage medium associated with the specific file.

5. The information processing apparatus according to claim 4, wherein the generation of the thumbnail image data is unsuccessful, and the means for executing the index display executes a display in the index display to indicate an inability to display a thumbnail image about the specific file.

6. The information processing apparatus according to claim 1, wherein the common item information is selected from the group consisting of a file name, a file size, a date and time of creation of a file, and a date and time of updating of a file.

7. The information processing apparatus according to claim 1, wherein the storage medium that stores the specific file and the management file includes at least one of a magnetic disk of a hard disk drive or a removable storage medium.

8. The information processing apparatus according to claim 1, wherein the non-volatile memory, other than the storage medium that stores the specific file and the management file, includes a flash memory.

9. An information processing apparatus, comprising:
a processor, including:
means for managing files stored on a storage medium which are adapted to share predetermined management-use information items of a file system, at least one of the management-use information items being associated with a specific one of the files stored on the storage medium, the management-use information items being stored in a management file stored on the same storage medium that stores the specific one of the files,
means for managing the specific one of the files stored on the storage medium using basic-file management information about that file which is separate from the predetermined management-use information items of the file system and which is stored in a non-volatile memory, other than the storage medium that stores the specific one of the files and the management file, within the information processing apparatus,
means for comparing, when performing an index display in which the specific file stored in the storage medium is displayed in an index style, contents of common item information of the at least one management-use information item of the file system that is associated with the specific file and stored in the management file stored on the same storage medium that stores the specific file and contents of common item information of the basic-file management information about the specific file stored in the non-volatile memory within the information processing apparatus, and
means for setting, in response to a comparison result issued by the comparing means, capability whether to playback and output the specific file.

10. The information processing apparatus according to claim 9, wherein the means for setting sets, based on the comparison result generated by the comparing means, unplaybackability and unoutputability of the specific file when the contents of the common item information of the at least one of the management-use information items associated with the specific file does not match the contents of the common item information of the basic-file management information about the specific file.

11. The information processing apparatus according to claim 9, wherein the means for setting sets, based on the comparison result generated by the means for comparing, capability to playback and output the specific file if the contents of the common item information of the at least one of the management-use information items of the file system match the contents of the common item information of the basic-file management information about the specific file.

12. The information processing apparatus according to claim 9, wherein the common item information is selected from the group consisting of a file name, a file size, a date and time of creation of a file, and a date and time of updating of a file.

13. The information processing apparatus according to claim 9, wherein the storage medium that stores the specific file and the management file includes at least one of a magnetic disk of a hard disk drive or a removable storage medium.

14. The information processing apparatus according to claim 9, wherein the non-volatile memory, other than the storage medium that stores the specific file and the management file, includes a flash memory.

15. An information processing method, comprising:
managing files stored on a storage medium which are adapted to share predetermined management-use information items of a file system, at least one of the management-use information items being associated with a specific one of the files stored on the storage medium, the management-use information items being stored in a management file stored on the same storage medium that stores the specific one of the files;
managing the specific one of the files stored on the storage medium using basic-file management information about that file which is separate from the predetermined management-use information items of the file system and which is stored in a non-volatile memory, other than the storage medium that stores the specific one of the files and the management file, within an information processing apparatus;
comparing, when performing an index display in which the specific file stored in the storage medium is displayed in an index manner, contents of common item information of the at least one management-use information item of the file system that is associated with the specific file and stored in the management file stored on the same storage medium that stores the specific file and contents of common item information of the basic-file management information about the specific file stored in the non-volatile memory within the information processing apparatus; and
executing the index display such that a result of the comparing step is reflected.

16. The information processing method according to claim 15, wherein the common item information is selected from the group consisting of a file name, a file size, a date and time of creation of a file, and a date and time of updating of a file.

17. The information processing method according to claim 15, wherein the storage medium that stores the specific file and the management file includes at least one of a magnetic disk of a hard disk drive or a removable storage medium.

18. The information processing method according to claim 15, wherein the non-volatile memory, other than the storage medium that stores the specific file and the management file, includes a flash memory.

19. An information processing method, comprising:
managing files stored on a storage medium which are adapted to share predetermined management-use information items of a file system, at least one of the management-use information items being associated with a specific one of the files stored on the storage medium, the management-use information items being stored in a management file stored on the same storage medium that stores the specific one of the files;
managing the specific one of the files stored on the storage medium using basic-file management information about that file which is separate from the predetermined management-use information items of the file system and which is stored in a non-volatile memory, other than the storage medium that stores the specific one of the files and the management file, within an information processing apparatus;
comparing, when playing back and outputting the specific file stored in the storage medium, contents of common item information of the at least one management-use information item of the file system that is associated with the specific file and stored in the management file stored on the same storage medium that stores the specific file and contents of common item information of the basic-file management information about the specific file stored in the non-volatile memory within the information processing apparatus; and
setting, in response to a result of the comparing step, capability whether to playback and output the specific file to be played back and outputted.

20. The information processing method according to claim 19, wherein the common item information is selected from the group consisting of a file name, a file size, a date and time of creation of a file, and a date and time of updating of a file.

21. The information processing method according to claim 19, wherein the storage medium that stores the specific file and the management file includes at least one of a magnetic disk of a hard disk drive or a removable storage medium.

22. The information processing method according to claim 19, wherein the non-volatile memory, other than the storage medium that stores the specific file and the management file, includes a flash memory.

23. A processor encoded with a computer program for carrying out an information processing method, the method comprising:
managing files stored on a storage medium which are adapted to share predetermined management-use information items of a file system, at least one of the management-use information items being associated with a specific one of the files stored on the storage medium, the management-use information items being stored in a management file stored on the same storage medium that stores the specific one of the files;
managing the specific one of the files stored on the storage medium using basic-file management information about that file which is separate from the predetermined management-use information items of the file system and which is stored in a non-volatile memory, other than the storage medium that stores the specific one of the files and the management file, within an information processing apparatus;
comparing, when performing an index display in which the specific file stored in the storage medium is displayed in an index manner, contents of common item information of the at least one management-use information item of the file system that is associated with the specific file and stored in the management file stored on the same storage medium that stores the specific file and contents of common item information of the basic-file management information about the specific file stored in the non-volatile memory within the information processing apparatus; and
executing the index display such that a result of the comparing step is reflected.

24. The processor according to claim 23, wherein the common item information is selected from the group consisting of a file name, a file size, a date and time of creation of a file, and a date and time of updating of a file.

25. The processor according to claim 23, wherein the storage medium that stores the specific file and the management file includes at least one of a magnetic disk of a hard disk drive or a removable storage medium.

26. The processor according to claim 23, wherein the non-volatile memory, other than the storage medium that stores the specific file and the management file, includes a flash memory.

27. A processor encoded with a computer program for carrying out an information processing method, the method comprising:
managing files stored on a storage medium which are adapted to share predetermined management-use information items of a file system, at least one of the management-use information items being associated with a specific one of the files stored on the storage medium, the management-use information items being stored in a management file stored on the same storage medium that stores the specific one of the files;
managing the specific one of the files stored on the storage medium using basic-file management information about that file which is separate from the predetermined management-use information items of the file system and which is stored in a non-volatile memory, other than the storage medium that stores the specific one of the files and the management file, within an information processing apparatus;
comparing, when playing back and outputting the specific file stored in the storage medium, contents of common item information of the at least one management-use information item of the file system that is associated with the specific file and stored in the management file stored on the same storage medium that stores the specific file and contents of common item information of the basic-file management information about the specific file stored the non-volatile memory within in the information processing apparatus; and
setting, in response to a result of the comparing step, capability whether to playback and output the specific file to be played back and outputted.

28. The processor according to claim 27, wherein the common item information is selected from the group consisting of a file name, a file size, a date and time of creation of a file, and a date and time of updating of a file.

29. The processor according to claim 27, wherein the storage medium that stores the specific file and the management file includes at least one of a magnetic disk of a hard disk drive or a removable storage medium.

30. The processor according to claim 27, wherein the non-volatile memory, other than the storage medium that stores the specific file and the management file, includes a flash memory.

31. An information processing apparatus, comprising:
a processor, including:
a specific-file management section that manages files stored on a storage medium which are adapted to share predetermined management-use information items of a file system, at least one of the management-use information items being associated with a specific one of the files stored on the storage medium, the management-use information items being stored in a management file stored on the same storage medium that stores the specific one of the files,
a basic-file management section that manages the specific one of the files stored on the storage medium using basic-file management information about that file which is separate from the predetermined management-use information items of the file system and which is stored in a non-volatile memory, other than the storage medium that stores the specific one of the files and the management file, within the information processing apparatus,
a comparing section that compares, when performing an index display in which the specific file stored in the storage medium is displayed in an index style, contents of common item information of the at least one management-use information item of the file system that is associated with the specific file and stored in the management file stored on the same storage medium that stores the specific file and contents of common item information of the basic-file management information about the specific file stored in the non-volatile memory within the information processing apparatus, and
display controlling section that executes the index display such that a comparison result by the comparing section is reflected.

32. The information processing apparatus according to claim 31, wherein the common item information is selected from the group consisting of a file name, a file size, a date and time of creation of a file, and a date and time of updating of a file.

33. The information processing apparatus according to claim 31, wherein the storage medium that stores the specific file and the management file includes at least one of a magnetic disk of a hard disk drive or a removable storage medium.

34. The information processing apparatus according to claim 31, wherein the non-volatile memory, other than the storage medium that stores the specific file and the management file, includes a flash memory.

\* \* \* \* \*